(12) United States Patent
Riener et al.

(10) Patent No.: US 8,108,190 B2
(45) Date of Patent: Jan. 31, 2012

(54) PROGRAMMABLE JOINT SIMULATOR WITH FORCE AND MOTION FEEDBACK

(76) Inventors: Robert Riener, Vaterstetten (DE); Rainer Burgkart, München (DE)

( * ) Notice: Subject to any disclaimer, the term of this patent is extended or adjusted under 35 U.S.C. 154(b) by 310 days.

(21) Appl. No.: 10/481,922

(22) PCT Filed: Jun. 25, 2002

(86) PCT No.: PCT/DE02/02337
§ 371 (c)(1),
(2), (4) Date: Jul. 30, 2004

(87) PCT Pub. No.: WO03/001483
PCT Pub. Date: Jan. 3, 2003

(65) Prior Publication Data
US 2004/0254771 A1    Dec. 16, 2004

(30) Foreign Application Priority Data
Jun. 25, 2001    (DE) .................................. 101 30 485

(51) Int. Cl.
*G06G 7/58* (2006.01)
*G09B 23/28* (2006.01)
(52) U.S. Cl. ......................................... 703/11; 434/267
(58) Field of Classification Search ................ 703/7, 11; 434/262, 267
See application file for complete search history.

(56) References Cited

U.S. PATENT DOCUMENTS

| | | | |
|---|---|---|---|
| 4,000,564 A | 1/1977 | Haffner et al. | |
| 4,200,995 A * | 5/1980 | Trella ........................... | 434/274 |
| 4,605,373 A * | 8/1986 | Rosen ........................... | 434/274 |
| 4,804,328 A | 2/1989 | Barrabee | |
| 4,850,877 A | 7/1989 | Mason et al. | |
| 5,441,413 A | 8/1995 | Kumar | |
| 5,509,810 A | 4/1996 | Schertz et al. | |
| 5,873,734 A * | 2/1999 | Griswold et al. ............. | 434/274 |
| 5,967,790 A * | 10/1999 | Strover et al. ................. | 434/274 |
| 6,126,450 A * | 10/2000 | Mukai et al. .................. | 434/262 |

FOREIGN PATENT DOCUMENTS

| | | |
|---|---|---|
| DE | 198 56 913 A1 | 6/2000 |
| WO | WO 99/38141 A1 | 7/1999 |
| WO | WO 99/39317 A1 | 8/1999 |

* cited by examiner

*Primary Examiner* — Kakali Chaki
*Assistant Examiner* — Ben Rifkin
(74) *Attorney, Agent, or Firm* — Kriegsman & Kriegsman

(57) ABSTRACT

A joint simulator for duplicating the biomechanical properties of body segments with joints. In one embodiment, the joint simulator

- includes a body model of the body segment to be simulated,
- controllable drive elements which are coupled mechanically with the body model in such a way that movements of the body model which correspond to real biomechanical joint movements of the body segment to be simulated can be effected by controlling the drive elements,
- a sensor arrangement for detecting forces and movements introduced by an examining person on the body model and
- a programmable control device for controlling the drive elements, whereby the control device is configured such that the measured signals processed by the sensor arrangement are introduced into a computer.

5 Claims, 19 Drawing Sheets a. actuator
b. activation signal, e.g., motor current, oil/air pressure, etc.
c. measured movement signal, e.g., joint angle, velocity, acceleration
d. measured joint torque (in extension/flexion direction)
e. movement only in flexion/extension direction a. actuator for extension/flexion
b. actuator for internal/external rotation
c. sensor for measurement of moments in the realized movement directions
d. actuator for abduction/adduction
e. actuator for internal/external rotation

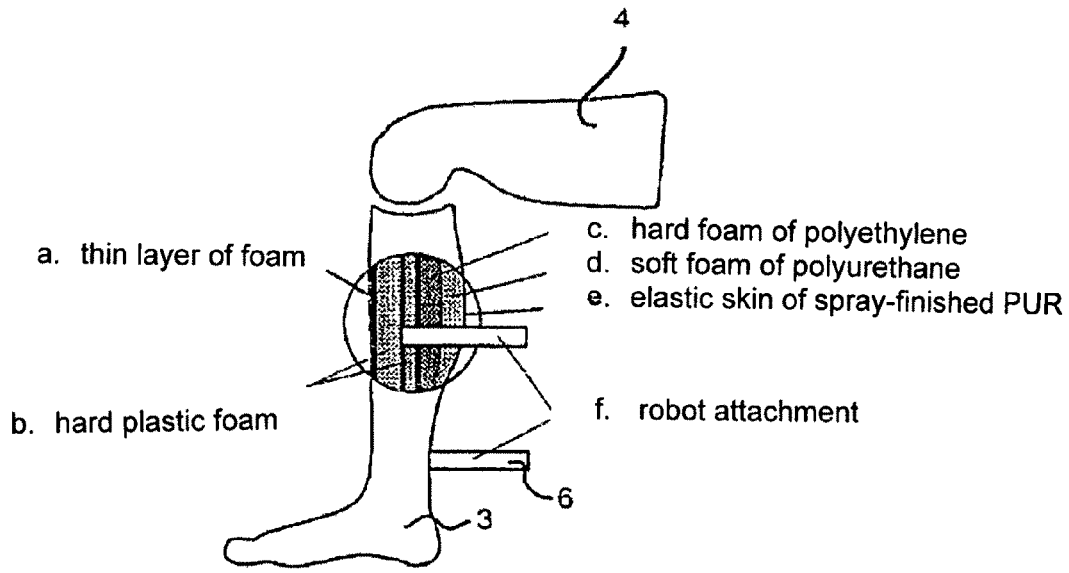
Fig. 3 Construction of the artificial tibia
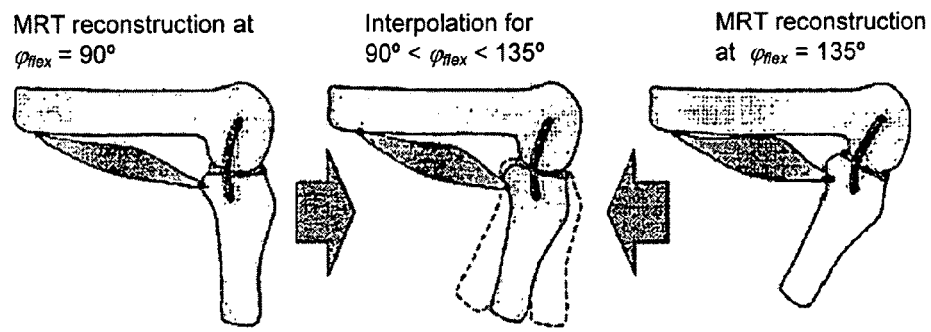
Figure 4. Interpolation of reconstructed image data for making possible an interactive (i.e., synchronized with haptics) and fluid movement course

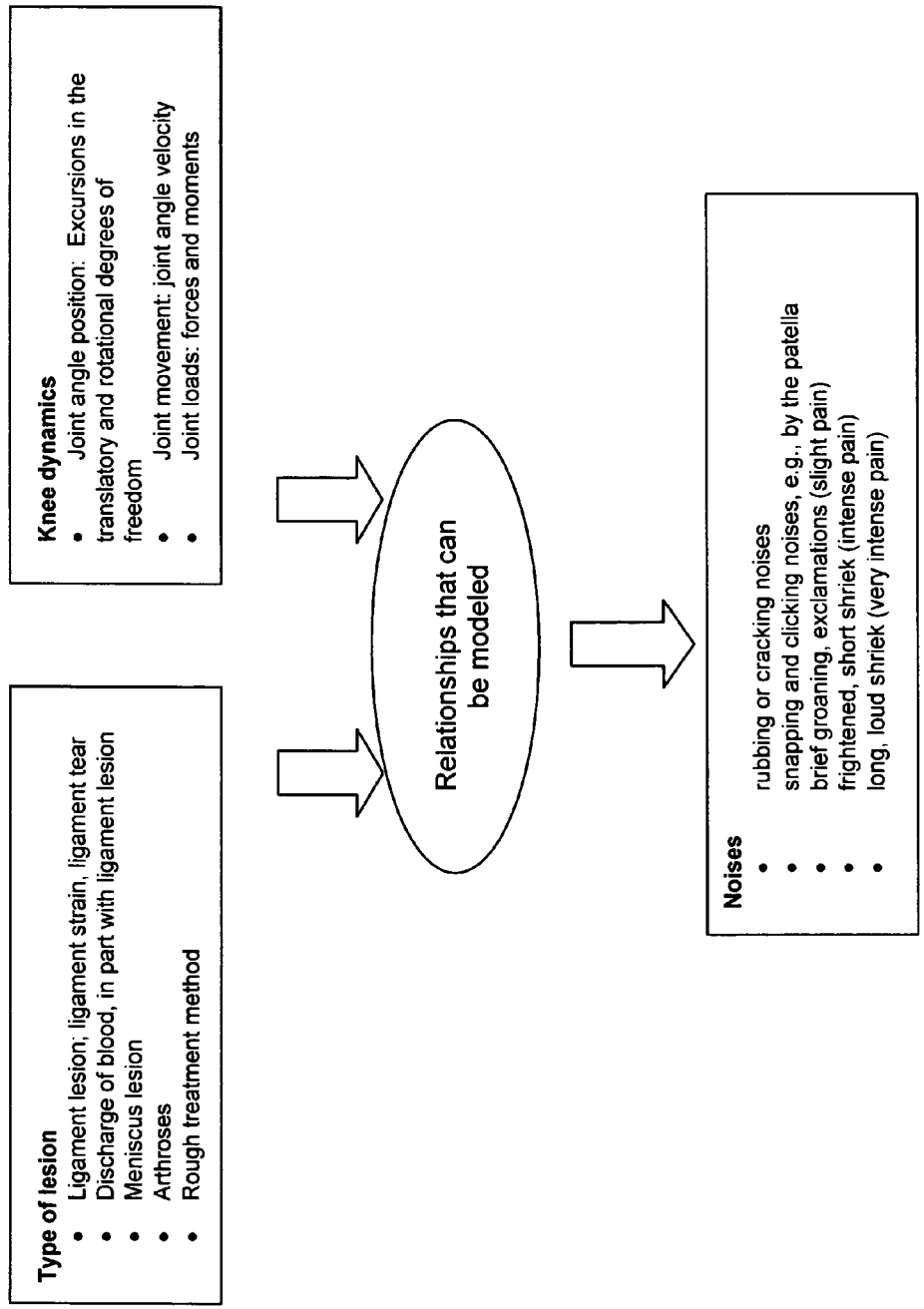
Fig. 5. Relationships for representing noises

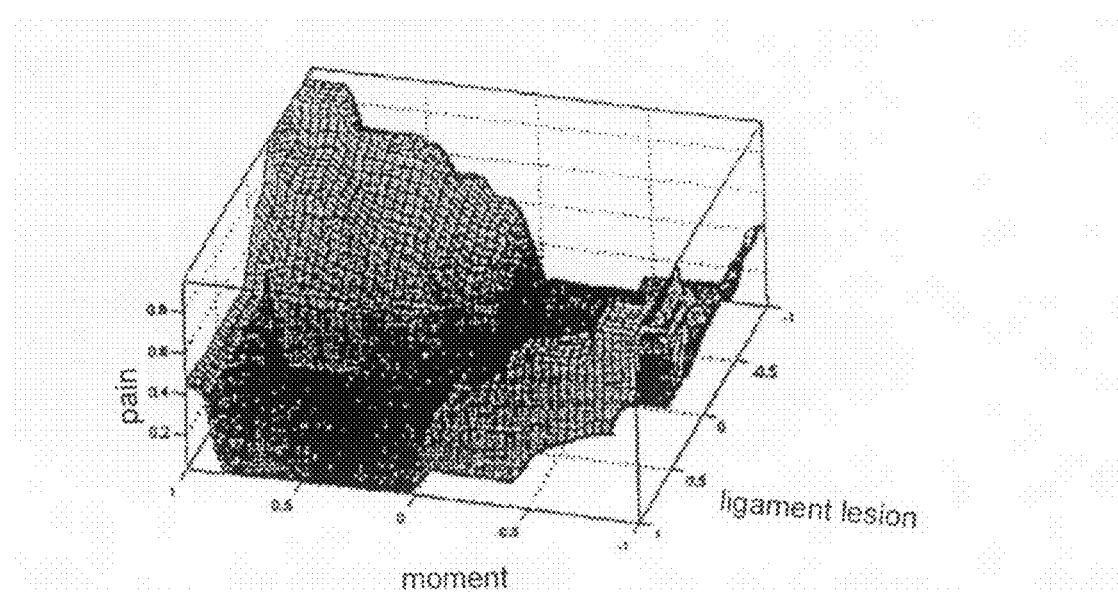
Fig. 6. Family of characteristic curves for the simulation of pain as a function of the degree of lesion of an internal ligament lesion and the impressed valgus moment
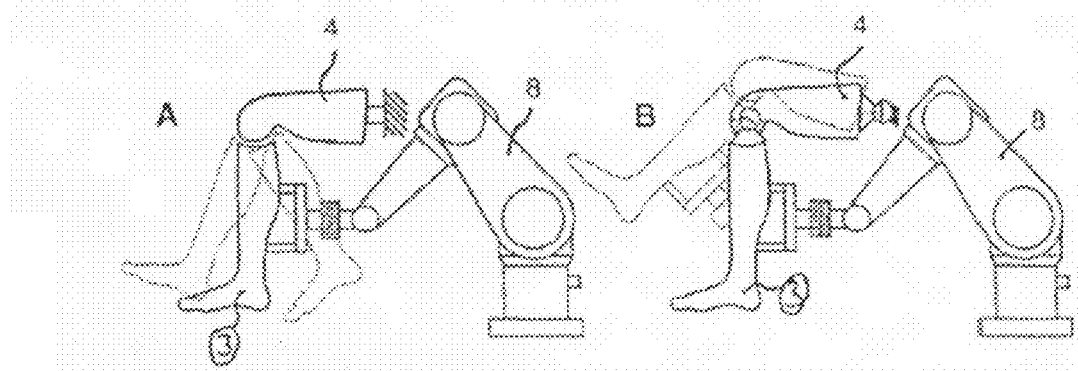
Fig. 7. Simulator configurations with arrested (A) and moveable (B) femur

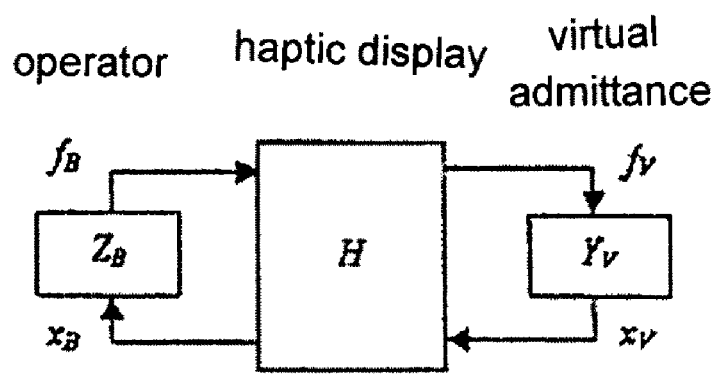
Fig. 8. Admittance architecture in network presentation
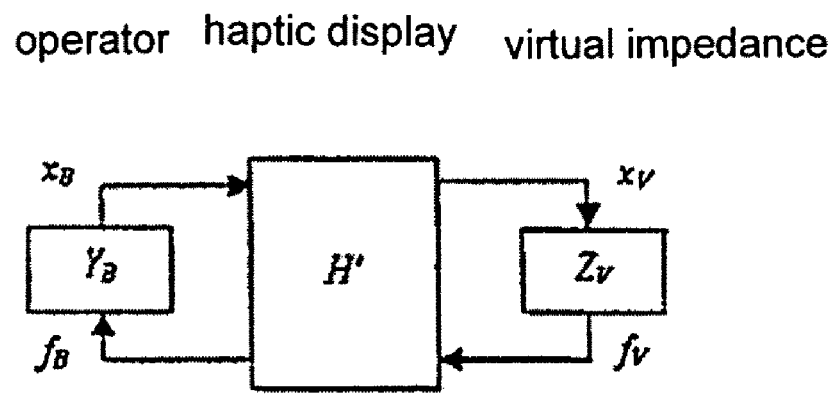
Fig. 9. Impedance architecture in network presentation

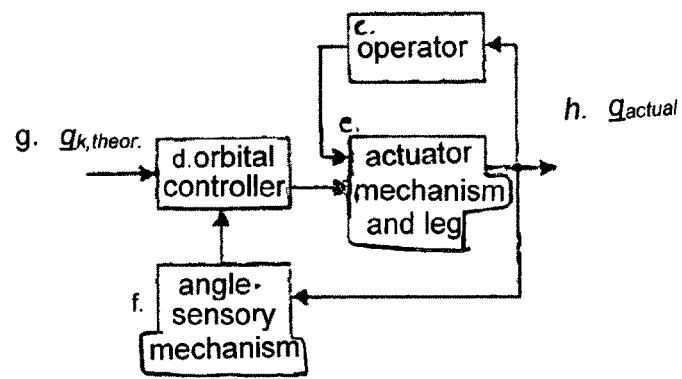
Fig. 10. Orbital control in active operating mode. Transformations from joint space to Cartesian space are not explicitly represented.

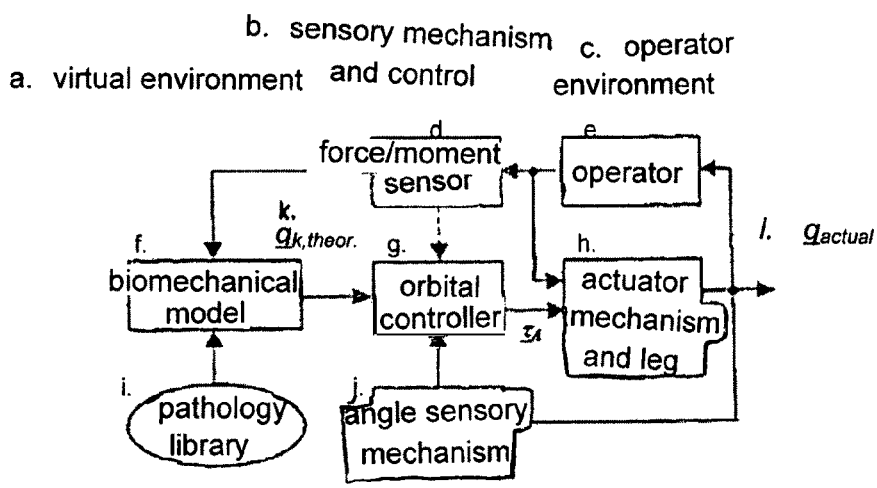
Fig. 11. Haptic representation of biomechanical knee properties by means of an admittance control architecture

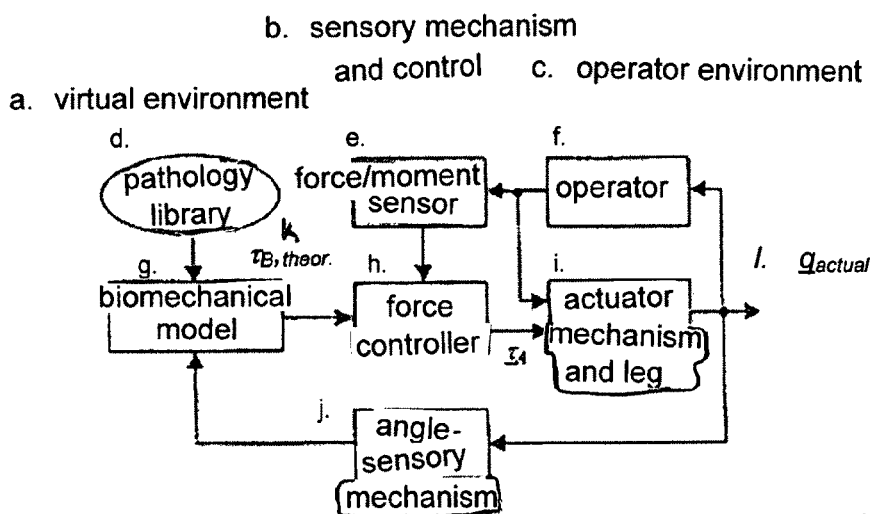
Fig. 12. Haptic representation of biomechanical knee properties by means of an impedance control architecture

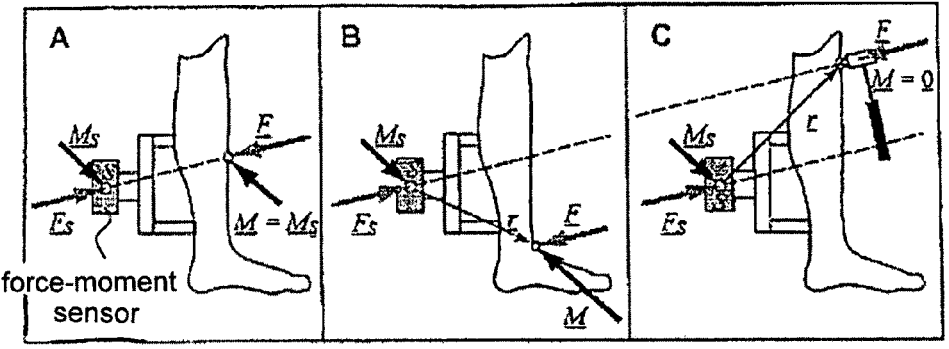
Fig. 13. Forces and moments in the knee-jerk tendon reflex. One and the same force/moment pair $F_s$ and $M_s$ at the sensor can be achieved from different load situations, A, B or C. In case C, the force is introduced without moment.
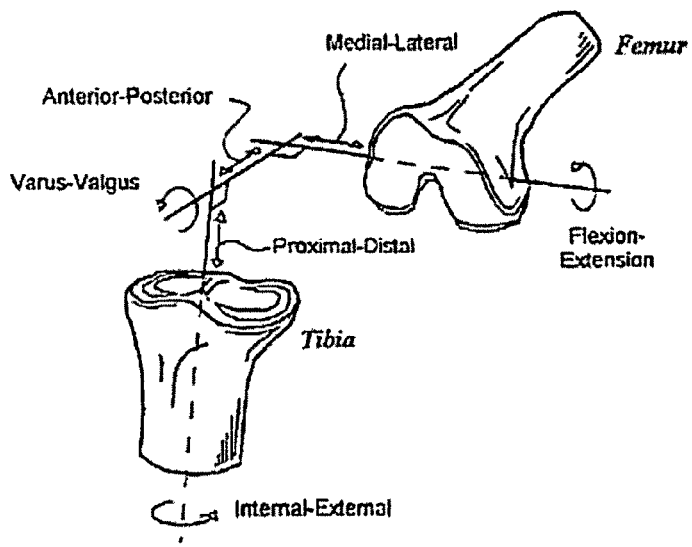
Fig. 14. The six degrees of freedom of the knee joint (adapted from Woo et al. 1994)

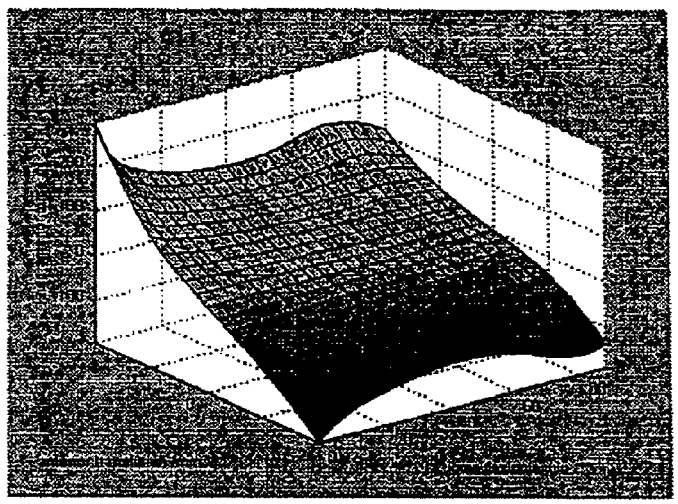
Fig. 15. 3D characteristic of the elastic force in the drawer direction $F^E_{ant}$ as a function of the drawer excursion $x_{ant}$ and the knee flexion angle, $\varphi_{flex}$.
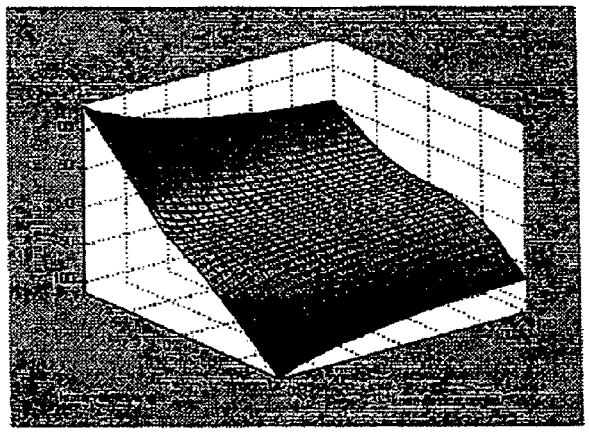
Fig. 16. 3D characteristic of the valgus moment $M^E_{val}$ as a function of the valgus and knee flexion angle, $\varphi_{val}$ or $\varphi_{flex}$.

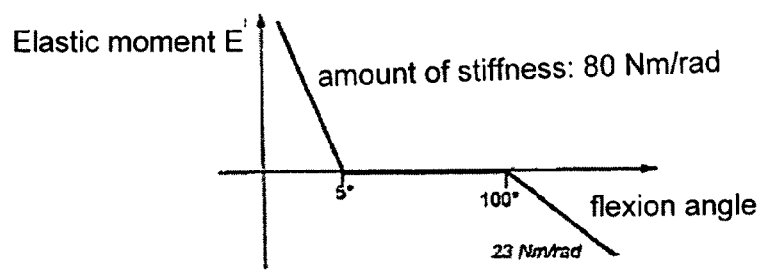
Fig. 17 Characteristic lines for describing joint stiffness in the flexion-extension direction. At 0°, the knee is found in full extension.

PROGRAMMABLE JOINT SIMULATOR WITH FORCE AND MOTION FEEDBACK

The invention concerns a programmable joint simulator for duplicating biomechanical properties of human and animal body segments with joints, i.e., an interactive anatomy simulator for learning anatomical relationships and for training medical manual techniques on a model of anatomical joint ratios. The training of clinical examination and the treatment of any type of joint pathologies still cannot be satisfactorily and efficiently conducted on patients, since, first of all, a great deal of experience is necessary in order to reliably master the large number of different tests and treatment methods. On the other hand, medical education is very theoretical. Learning or training on patients is only very limited or is not possible at all, since not very many patients with the specific joint pathologies are available at a certain point in time. The gathering of practical experience is thus very expensive and time-consuming and must be attended by experienced medical professionals. Consequently, several years of practice are necessary until the aspiring physician masters the basic clinical examination tests and treatment methods and can use them fully and independently without supervision. Medical education and training on patients is accordingly very expensive. Training on anatomical preparations (cadavers), in animal experiments or on passive mechanical models is not a meaningful alternative. To solve the above-described problems, the technique of virtual reality (VR) is being used increasingly.

PRIOR ART a. Instrument-Based Interaction:

The particular feature of most new training simulators for medicine, particularly for surgery, which are under development, consists of the fact that not only visual, but also haptic information is fed back via appropriate force displays and thus realistic impressions of forces can be transmitted to the operator. This is a good technical solution—at least for a limited number of degrees of freedom, since forces are introduced via surgical instruments, which the operating surgeon holds in his hands and makes use of. This technique is designated "instrument-based haptics" or "tool-based haptic displays".

Due to the use of such instrument-based VR simulators, the learning of special operating techniques, for example, in minimally invasive surgery, can be clearly supported. Many groups are currently working on the development of such simulation systems, for example, in laparoscopy (Kühnapfel et al., 1997; Baur et al., 1998; Tendick et al., 2000), knee arthroscopy (Ward et al., 1998; Müller und Bockholt, 1998), shoulder arthroscopy (Smith et al., 1999), endoscopic gynecology (Szekely et al., 1999) and ear, nose and throat medicine (Rudman et al., 1998). Even complicated open operations, for example, in surgery (Delp et al., 1997) or eye surgery (Holland and Childers, 1995), can be well taught and planned by appropriate VR simulation systems. Other VR environments have been developed in order to practice the placement of an injection (Dang et al., 2001) or the positioning of a catheter (patent of Merril and Millman, 1996) with force feedback. This idea was generally formulated for medical applications in a patent by Jacobus and Griffin (1995).

The disadvantage of instrument-based approaches and devices is that body segments are contacted exclusively with instruments. Therefore, this technique is not suitable for examinations in which the physician must grasp and move the body segment concerned by contact with the hands and fingers.

b. Interaction by Virtual Palpation:

More difficult than the representation of instrument-based interactions is the simulation of gripping movements and probing procedures (palpation), in which the physician works directly with his/her hands. Tactile information and finger kinesthetics must also be taken into consideration, whereby tactility is understood as sensory perception via the touch sense and kinesthetics is understood as sensory perception of the position and movement of the body or body part and the acting forces. Special data gloves are used for imparting kinesthetic impressions in the fingers (e.g., CyberGrasp™ of Virtual Technology Inc. or Rutgers Master, see Langrana, 1994) An application has been published according to which contact with a virtual leg and a virtual knee is made possible with the Rutgers Master data glove. (Langrana, 1994). Many groups utilize the haptic display PHANToM™ (SensAble Technologies Inc.), in order to impart impressions of force in an individual finger (patent of Rosenberg and Jackson, 1996). Howe et al. (1995) presented a tactile display that can be utilized for the transmission of tactile information for telesurgical interventions. Other techniques have been developed for the tactile representation of texture impressions (patents of Kramer, 1990; Kramer, 1997). Techniques by which tactile contact impressions are simulated have so far still not been developed.

Tactile and finger-kinesthetic displays have the disadvantage that they can be executed only with great technical effort and are thus expensive, but only offer a limited approximation to reality.

c. Interactive Visualization and Anatomical Atlases:

More mature as haptic, particularly tactile display techniques are pure graphical systems. Digital anatomical atlases support the study of anatomy. They make possible an interactive visualization of static anatomical structures, by which the operator can move through the body via input by mouse or joystick and thus the anatomy can be experienced from any direction and in different sections (Human Interfaces AG & Fraunhofergesellschaft; 3B SCIENTIFIC Company). A few research groups are making efforts to expand the graphical displays with haptic displays, so that the anatomical structures are also touched with the above-mentioned techniques (e.g. the PHANToM device) and can be modified under certain circumstances (Langrana, 1994; Keeve and Kikinis, 1999; Kling-Petersen and Rydmark, 2000). Pieper et al. (1991) have come up with another idea. A VR simulation environment was conceived for the study of biomechanics and the underlying anatomy (functional anatomy) of the lower extremity. The operator is thus in a position not only to touch virtual muscles, tendons, ligaments and other structures of the leg, but also to manipulate them and thus to attain a feel for the resultant joint properties due to moving the leg. This idea, however, is also based on the above-described expensive techniques for producing haptic and tactile impressions.

Other groups are developing VR systems, in which an animated 3 D image is blended into a real scene in order to deliver, for example, important additional information to the physician during an operation (Völter et al., 1995; Blackwell, et al., 1998). The true-to-perspective blending in is accomplished via semitransparent flat screens, stereo data glasses (Tang et al., 1998; Rolland and Fuchs, 2000) or surgical microscopes (Edwards et al., 1999).

In the field of biomechanics, a multiple number of studies are concerned with interactive graphic animation of anatomical structures of individual articulations, such as, for example, the knee joint (Garg and Walker, 1990; Baillot et al., 2000). In a patent of Aouni-Aleshian et al. (2000), such mathematical simulations are described for joints in general. It is common to these approaches that a calculation of biomechanical properties and the graphic animation of calculated joint ratios or joint movements are produced. Such simulation approaches are predominantly used for anatomical study as well as for pre-operative planning and as an approach to intraoperative navigation in orthopedics. An animation approach, which is exclusively based on movement equations, is described in a patent of Handelman et al. (2001).

Additional graphic-based systems have been developed, not only for the presentation of anatomical relationships, but also for teaching and training of medical treatment procedures (patents of Mukai et al., 1999; Ramshaw et al., 1998). The advantage of these approaches is that the utilization of real objects or substitute physical objects is not necessary. Of course, only a theoretical training of the operator results, and not a practical one. This idea of (audio-)visual teaching for applications even outside medicine was generally formulated in a patent by Barrabee (1989).

d. Interaction with Passive Mechanical Systems:

In medicine, practical education and training are primarily carried out with patients, in individual cases also with the anatomical preparation (cadaver) or in animal experiments. Passive mechanical models of joints, bones, muscles, organs or soft tissues are rarely used. Different companies (3B SCIENTIFIC, Somso Modelle [Models], among others) offer plastic models commercially, which are only suitable, however, for spatial demonstration of anatomical structures for theoretical training and not for the presentation of physiological or pathological functions. A realistic and extensive training based on different case examples is thus not possible, since the models can be moved and deformed only in a limited way and do not permit the necessary adjustability or adaptability to different types of wounds and patients with different anthropometric characteristics.

There are a number of patent applications for mechanical models with joint properties that are perceived as realistic, which are used as dummies in vehicle testing techniques (patents of Woley and Welanin, 1981; Daniel, 1982; Kortge, 1980; Denton and Morgan, 1984) or for the training of rescue techniques (patent of Trivett, 2000). Many of these models make possible a limited modification of the joint properties (patent of Woley and Welanin, 1981) and indeed approximate measurements of inner forces that occur (patent of Daniel, 1982), but their construction is not anatomically correct, and the possibilities for adjustment are greatly limited, so that these models are not suitable for clinical training.

Other mechanical solutions, by which means specific pathologies can be represented, are essentially limited to bone fractures (patents of Sandegard, 1982; Lindskog and Sandegard, 1989; Rosen, 1986; Smreka, 1973). A very expensive mechanical apparatus for the simulation of muscle/ligament lesions was developed by Mason et al., a patent application was filed (1989, patent) and [the apparatus] was constructed (Paulos et al., 1991). A real knee anatomy is essentially reproduced by artificial technical components in this invention. The apparatus consists of an artificial femur and tibia, which are held together by cables. The cables correspond to the most important knee ligaments and knee muscles, and these are connected to force measurement cells. Therefore, the forces occurring during a movement can be determined in the corresponding components. This apparatus is very well suitable for the observation of different knee lesioning processes and with some limitation to the testing of kneepieces [replacements] and other orthopedic devices (Paulos et al., 1991). The number of anatomical components, degrees of freedom of movement and knee lesions that can be represented, however, is greatly limited.

Another group involves palpable passive plastic models. Several layers or inclusions of materials of different hardness/shape produce an object that feels very realistic when palpated and thus, e.g., can be utilized for the training of breast palpation in gynecology (patents of Goldstein, 1989; Fasse, 1975), for injection training (patent of Graham and Sabelman, 1983), for the practicing of surgical incisions (patents of Trivett, 2000; Lewis and Nusbaum, 1984), for palpation of organs (Greenfield and Johnson, 1993) and for the training of specific measures on the upper part of the body, such as cardiac massage, palpation of the pulse, withdrawal of blood, palpation, etc. (patents of Voights, 1982; Baldwin, 1988; Kohnke, 1992). Other models are characterized by their realistic appearance and can be used, e.g., for the training of knee arthroscopies or other surgical interventions on the knee (patent of Strover and Strover, 1999).

Passive mechanical systems have specific properties inherent in the system, and these can be adapted only inadequately to different real situations.

e. Active Systems with Mechatronic Anatomical Components:

There exist a number of approaches in which anatomical components (e.g., extremities) actively carry out a specific theoretical movement that is defined in advance by an appropriate actuator mechanism. Examples of such mostly humanoid movement machines are an artificial human torso for reproducing upper body movements (patent of Johnson and Gurr, 1995), an artificial motorized hand joint for exoprotheses (patent of Yasutaro, 1996), an artificial individual joint with active brake (patent of Haffner and Pizer, 1977), an artificial torso with a cardiac movement actuator mechanism (patent of Messmore, 1986).

Active systems, however, conduct only predefined movements, which cannot be influenced by the examining person (physician).

SUMMARY OF THE PRIOR ART

There exist passive, active and interactive systems for the simulation of anatomical components or physiological functions of humans or animals. The systems of the prior art are limited to:

instrument-based, mechatronic approaches for imparting contact impressions, which arise when an instrument makes contact with simulated anatomy and the latter acts on the instrument, mechatronic approaches with haptic-tactile display for imparting direct contact impressions onto the fingers and fingertips (e.g. for palpation simulation), electronic-visual systems (graphic animations) as well as movable passive mechanical systems (dolls, plastic models, etc.).

CITED SPECIALIZED LITERATURE

[1] Baillot, Y., Rolland, J. P., Lin K.-C., Wright, D. L. (2000): Automatic modeling of knee-joint motion for the virtual reality dynamic anatomy (VRDA) tool. *Presence* 9, pp. 223-235.

[2] Baur, C., Guzzoni, D., Georg, O. (1998) VIRGY: A virtual reality and force feedback based endoscopic surgery simulator. *Stud. Health Technol. Inform.* 50, pp. 110-116.

[3] Blackwell, M., Morgan, F., DiGioia, A. M. (1998): Augmented reality and its future in orthopaedics. *Clinical Orthopaedics and Related Research* 354, pp. 111-122.

[4] Burdea, G., Patounakis, G., Popescu, V., Weiss, R. (1999): VR-based training for diagnosis of prostate cancer. *IEEE Trans. Biomed. Eng.* 46, pp. 1253-1260.

[5] Dang, T., Annaswamy, T. M., Srinivasan, M. A. (2001): Development and evaluation of an epidural injection simulator with force feedback for medical training. *Stud. Health Technol. Inform.* 81, pp. 97-102.

[6] Delp, S. L., Loan, P., Basdogan, C., Rosen, J. M. (1997): Surgical simulation: an emerging technology for training in emergency medicine. *Presence* 6, pp. 147-159.

[7] Edwards, P. J., King, A. P., Hawkes, D. J. et al. (1999): Stereo augmented reality in the surgical microscope. *Stud. Health Technol. Inform.* 62, pp. 102-108.

[8] Garg, A., Walker, P. S. (1990): Prediction of total knee motion using a three-dimensional computer-graphics model. *J. Biomechanics* 23, pp. 48-58.

[9] Höhne, K.-H. (2000): VOXEL-MAN 3 D-Navigator. CD-ROM/Diskette, Springer-Verlag, Berlin.

[10] Howe, R. D., Peine, W. J., Kontarinis, D. A., Son, J. S. (1995): Remote palpation technology for surgical applications. *IEEE Engineering in Medicine and Biology Magazine* 14, pp. 318-323.

[11] Keeve, E., Kikinis, R. (1999): Biomechanics-based simulation of knee dynamics. Proc. of the IEEE-EMBS conference, Atlanta, USA, Oct. 13-16, pp. 558.

[12] Kling-Petersen, T., Rydmark, M. (2000): Modeling and modification of medical 3 D objects. The benefit of using a haptic modeling tool. Proc. of the Medicine Meets Virtual Reality Conference, Newport Beach, USA, pp. 162-167.

[13] Kühnapfel, U., Kuhn, C., Hübner, M., Krumm, H. G., Maass, H., Neisius, B. (1997): The Karlsruhe endoscopic surgery trainer as an example for virtual reality in medical education. *Minimally Invasive Therapy and Allied Technologies,* 6, pp. 122-125.

[14] Langrana, N. A., Burdea, G., Lange, K., Gomez, D., Deshpande, S. (1994): Dynamic force feedback in a virtual knee palpation, *Artificial Intelligence in Medicine,* 6, pp. 321-333.

[15] Müller, W., Bockholt, U. (1998): The virtual reality arthroscopy training simulator. *Stud. Health Technol. Inform.* 50, pp. 13-19.

[16] Paulos, L. E., Cawley, P. W., France, E. P. (1991): Impact biomechanics of lateral knee bracing. The anterior cruciate ligament. *The American Journal of Sports Medicine,* 19, pp. 337-342.

[17] Pieper, S., Delp, S., Rosen, J., Fisher, S. (1991): A virtual environment system for simulation of leg surgery. Proc. Stereoscopic Display and Applications II, SPIE 1457, pp. 188-196.

[18] Riener, R., Burgkart, R. (2001): A survey study for the development of virtual reality technologies in orthopedics. 9th Annual Medicine Meets Virtual Reality (MMVR) Conference, Newport Beach, Calif., Jan. 24-27, 2001.

[19] Rolland, J. P., Fuchs, H. (2000): Optical versus video see-through head-mounted displays in medical visualization. *Presence* 9, pp. 287-309.

[20] Rudman, D. τ., Stredney, D., Sessanna, D., Yagel, R., Crawfis, R., Heskamp D., Edmond, C. V., Wiet, G. J. (1998): Functional endoscopic sinus surgery training simulator. *Laryngoscope* 108, pp. 1643-1647.

[21] Smith, S., Wan, A., Taffinder, N., Read, S., Emery, R., Darzi, A. (1999): Early experience and validation work with Precedicus VA—the Prosolva virtual reality shoulder arthroscopy trainer. *Stud. Health Technol. Inform.* 62, pp. 337-343.

[22] Szekely, G., Schweitzer, G. et al. (1999): Virtual reality based surgery simulation for endoscopic gynaecology. *Stud. Health Technol. Inform.* 62, pp. 351-357.

[23] Tang, S. L., Kwoh, C. K., Teo, M. Y., Sing, N. W., Ling, K. V. (1998): Augmented reality systems for medical applications. *IEEE Engineering in Medicine and Biology Magazine* 17, pp. 49-58.

[24] Tendick, F., Downes, M., Goktekin, T., Cavusoglu, M. C., Feygin, D., Wu, X., Eyal, R., Hegarty, M., Way, L. W. (2000): A virtual environment testbed for training laparoscopic surgical skills. *Presence* 9, pp. 236-255.

[25] Völter, S., Krämer, K.-L., Niethard, F. U., Ewerbeck, V. (1995): Virtual Reality in der Orthopädie: Prinzipien, Möglichkeiten und Perspektiven [Virtual Reality in orthopedics: Principles, possibilities and perspectives]. *Z Orthop.* 133, pp. 492-500.

[26] Ward, J. W., Wills, D. P., Sherman, K. P., Mohson, A. M. (1998): The development of an arthroscopic surgical simulator with haptic feedback. *Future Generation Computer Systems Journal* 14, pp. 243-251.

CITED PATENTS

[27] Aouni-Aleshian G. H., Blankevoort, L., Kwak, S. D., Mow, V. C. (2000): Three dimensional multibody modelling of anatomical joints. U.S. Pat. No. 6,161,080.

[28] Baldwin, J. F. (1988): Training mannequin. U.S. Pat. No. 4,773,865.

[29] Barrabee, K. P. (1989): Interactive audio-visual teaching method and device. U.S. Pat. No. 4,804,328.

[30] Daniel, R. P. (1982): Force-indicating dummy legs. U.S. Pat. No. 4,349,339.

[31] Denton, R. A., Morgan, C. R. (1984): Crash test dummy lower leg. U.S. Pat. No. 4,488,433.

[32] Fasse, W. G. (1975): Breast cancer detection training device. U.S. Pat. No. 4,001,951.

[33] Goldstein, M. K. (1989): Breast cancer detection model and method for using same. U.S. Pat. No. 4,867,686.

[34] Graham, T. E., Sabelman, E. E. (1983): Human skin model for intradermal injection demonstration or training. U.S. Pat. No. 4,481,001.

[35] Greenfield, C. L., Johnson, A. L. (1993): Anatomically correct artificial organ replicas for use as teaching aids. U.S. Pat. No. 5,518,407.

[36] Haffner, M. P., Pizer, R. S. (1977): Programmable anthropomorphic articulation. U.S. Pat. No. 4,000,564.

[37] Handelman, D. A., Lane, S. H., Gullapalli, V. (2001): Limb coordination system for interactive computer animation of articulated characters. U.S. Pat. No. 6,191,798.

[38] Holland, S., Childers, B. (1995): Interactive multimedia eye surgery training apparatus and method. U.S. Pat. No. 5,454,722.

[39] Jacobus, C. J., Griffin, J. L. (1995): Method and system for simulating medical procedures including virtual reality and control method and system for use therein. U.S. Pat. No. 5,769,640.

[40] Johnson, B. S., Gurr, R. H. (1995): Robotic human torso. U.S. Pat. No. 5,394,766.

[41] Kohnke, O. B. (1992): Training manikin for practising external cardiac massage. European Patent No. 560,440.

[42] Kortge, J. O. (1980): Knee joint for anthropomorphic dummy. U.S. Pat. No. 4,235,025.

[43] Kramer, J. F. (1990): Force feedback and textures simulating interface device. U.S. Pat. No. 5,184,319.

[44] Kramer, J. F. (1997): Force feedback and texture simulating interface device.

U.S. Pat. No. 5,631,861.

[45] Lewis, L. A., Nusbaum, B. P., Leeds, H. R. (1984): Simulated skin and method. U.S. Pat. No. 4,596,528.

[46] Lindskog, K., Sandegard, J. (1989): Device for teaching treatment of skeletal injuries. U.S. Pat. No. 4,802,858.

[47] Mason, J. T., Cawley, P. W., Mason., B. R. (1989): Method of determining stress effects in components of the human knee and anthropomorphic leg device therefor. U.S. Pat. No. 4,850,877.

[48] Merril, J. R., Millman, A. S. (1996): Computer based medical procedure simulation system. PCT Application No. WO 96/28800.

[49] Messmore, F. B. (1986): Cardiac training mannikin. U.S. Pat. No. 4,601,665.

[50] Mukai, N., Harada, M., Muroi, K. (1999): Medical simulator system and medical simulator notifying apparatus. U.S. Pat. No. 6,126,450.

[51] Ogden, A. M., Monroe, M. M., Barnett, D. E. (1999): Apparatus for controlling an animated structure. U.S. Pat. No. 5,870,842.

[52] Ramshaw, B. J., Garcha, I., Naum, R., Franklin, K. (1998): Interactive medical training system. U.S. Pat. No. 5,791,907.

[53] Rosen, B. A. (1986): Training device for setting broken limbs. U.S. Pat. No. 4,605,373.

[54] Rosenberg, L. B., Jackson, B. G. (1996): Electromechanical human-computer interface with force feedback. U.S. Pat. No. 5,576,727.

[55] Sandegard, J. D. (1982): Device for use when training the appropriate handling of a dislocated injury on a part of a body. U.S. Pat. No. 4,350,490.

[56] Smreka, J. G. (1975): Breakable leg. U.S. Pat. No. 3,895,451.

[57] Strover, S. M., Strover, A. E. (1999): Surgical model. U.S. Pat. No. 5,967,790.

[58] Taisuke S. (2000): Limb driving apparatus. Japanese Patent No. 10[1998] 373,847.

[59] Trivett, I. D. (2000): Artificial limb for training dummy. European Patent No. EP 987,667.

[60] Voights, D. L. (1982): Palpation and ascultation teaching method and apparatus. U.S. Pat. No. 4,411,629.

[61] Woley, P. F., Welanin, M. J. (1981): Knee joint for anthropomorphic dummy. U.S. Pat. No. 4,276,032.

[62] Yasutaro, M. (1996): Robot device. Japanese Patent No. 6[1994]-239,420.

The object of the present invention is to further improve the possibilities for simulation of the biomechanical properties of human or animal body segments with joints in order to reduce the deficiencies shown in the above-described prior art.

This object is solved with a device according to claim 1.

A programmable joint simulator is provided for duplicating the biomechanical joint properties of human and animal body segments. The joint simulator simulates the real behavior of the respective natural body segment when the latter is grasped, palpated or moved by the hands of an examining person, such as, e.g., a physician, i.e., the joint simulator reacts, when taken hold of by the hands, just like a healthy natural body segment or like one affected with different disorders or lesions. It is possible, due to the property of programmability, to assign to the joint simulator the most varied disorders and lesions merely "by pushing a button".

The joint simulator according to the invention has the following features:

A body model, which essentially corresponds in shape to the body segment with the respective joint which is to be examined. In a simulation of a human knee joint, accordingly, a tibia and a femur are reproduced, which preferably have the hardness, shape and size of a natural human leg. However, cases of application are also possible, in which the body model is smaller or larger than the natural body segment. Preferably, the body model is made of plastic.

Controllable drive elements are provided, which are coupled mechanically with the body model. The configuration of the drive elements and the coupling are technically executed so that realistic movements and/or relative movements of the body model can be effected by manual maneuvers of the examining person. Independent of the concrete configuration of the drive elements and their coupling with the body model, the only prerequisite that must be fulfilled is that, e.g., the body model of a leg can be moved by the physician approximately just like a natural leg. These relationships will be explained further below in the examples of embodiment.

A sensor arrangement is provided on the drive elements and/or on the mechanical coupling to the body model for detecting the forces and movements that are triggered. The sensor arrangement is thus connected with the mechanical-kinematic body model so that the forces triggered by the examining person and the movements induced are configured as measured signals. The person skilled in the art can select sensors for the measurement of forces, distances [paths], angles and torques from measuring and control techniques for the detection of forces and movements, such as, e.g., displacements and rotations, changes in length or torques. Accordingly, the selection is made from the point of view of functionality and cost. Very detailed information and suggestions will be given in the examples of embodiment in this regard.

The measured signals are introduced into a programmable control device, which is connected to a computer by signal technology. The control device is set up in connection with control algorithms so as to control the drive elements as a function of the manually introduced forces and the triggered displacements, which are induced by the examining person. The control device has the function of generating reaction forces and movements which correspond to the biomechanical behavior of a real body segment when forces triggered by the examining person act on it.

Therefore, when a physician, e.g., grasps the mechanical-kinematic knee-joint model and moves it in a way such as he/she would also move a human leg for purposes of examination, the forces and movements triggered by the physician are measured, for which purpose, preferably, sensors that generate an electrical output signal are utilized. These output signals of the sensors are introduced into the control device. The drive elements are controlled by means of a program in such a way that the same movements and reaction forces are haptically experienced by the physician, i.e., felt or perceived as in an examination of a natural leg. It is clear to the person skilled in the art that the same considerations apply to any body segment which has a joint, such as, e.g., the joints of the upper extremities (shoulder, elbow, wrist) and lower extremities (hip, knee, ankle joint). In the case of an interactive knee joint, the examining person feels the passive properties of the knee joint when the tibia is moved or when the aperture is opened.

Basically, the invention is also applicable to interactive multiple joints. Thus, e.g., the spine, fingers, toes, hand and tarsus bones are modeled as several individual joints arranged in rows next to one another. Groups of segments (e.g., vertebra) can be assembled into stationary segments or each segment can also be considered individually. Each of these segments is connected to the corresponding action program, so that the operator—according to the same principle as in the case of the interactive individual joint—can interact with one or more segments/vertebra.

Further, it will be mentioned that such effects, as e.g., the influence of post-mortem rigidity, also can be simulated relative to joint mobility. The application is also not limited to human body segments and can also be utilized for the training of veterinarians.

It should be particularly mentioned that the design of the mechanical-kinematic model, the type of drive elements (actuators) and the technical configuration of the sensor couplings can be different in each case of application. Additional detailed information on control algorithms and construction hints for building joint simulators for the simulation of different joints are disclosed in the example of embodiment.

The programmability of the control device makes it possible that a plurality of different biomechanical properties can be simulated, in order to thus simulate a plurality of pathological conditions of the body segment.

By this combination of features, a multivalent useful joint simulator was created for the simulation of the most varied medical conditions of a body segment. It is thus possible to provide the most varied disorder and lesion conditions so that they can be called up. For the first time, the lengthy training with patients can be extensively dispensed with. Care must also be taken that training on a living person or animal often may not be conducted on such living person or animal, since specific examinations cause pain and may also lead to damage.

An enhancement of the invention according to claim 2 has an optical display device, which is connected with the joint simulator by signal technology, so that during the activity on the mechanical-kinematic body model, the examining person sees a graphic representation of the natural body segment, which is directly simulated. The graphic representations can be generated, e.g., by nuclear spin tomography or by x-ray technology. However, computer-generated graphic images or special animations can also be presented. In the case of a joint simulation, e.g., the joint could be shown alone or the joint could be shown with the surrounding ligaments, as desired. Additional information can also be shown, such as, e.g. forces or stresses that occur. Graphic indications can also be given, [for example], at which place the examining person must grasp the body segment. The information content and the learning effect will be basically increased with the enhancement of the invention according to claim 2.

An enhancement of the invention according to claim 3 has an acoustic display device, which is connected with the joint simulator by signal technology, so that during the activity on the mechanical-kinematic body model, the examining person receives acoustic information. For example, noises can be reproduced, which arise when a joint is moved. Sound articulations caused by pain can also be reproduced, however, which, e.g., can occur when a diseased joint is moved or when a healthy joint is over-stressed or when there is excessive pressure at a predetermined place on the abdomen. In its simplest design, the acoustic display device is a speaker or a headset at the audio outlet of the joint simulator. The information content and the learning effect will be further increased with the enhancement of the invention according to claim 3.

In the enhancement of the invention according to claim 4, sound generation means are integrated into this body segment for reproducing noises which are generated by this body segment during its examination. Thus, e.g., piezo microspeakers, which acoustically imitate the snapping in of a dislocated joint, can be incorporated in the joint, so that a very realistic impression is communicated to the examining person. The information content will be increased and the learning effect will be further improved also with this enhancement.

The invention will now be explained in more detail based on examples of embodiment in connection with schematic drawings and theoretical explanations.

FIG. 1a-m show different embodiments of a knee-joint simulator.

FIG. 3 shows the cross section of an artificial tibia.

FIG. 4 shows an interpolation of reconstructed image data.

FIG. 5 shows relationships for the presentation of noises.

FIG. 6 shows a family of characteristic curves for the simulation of pain.

FIG. 7 shows simulator configurations with arrested and movable femur.

FIG. 8 shows the admittance architecture in network presentation.

FIG. 9 shows the impedance architecture in network presentation.

FIG. 10 shows the orbital control in active operating mode.

FIG. 11 shows the haptic representation of biomechanical knee properties by means of an admittance architecture.

FIG. 12 shows the haptic representation of biomechanical knee properties by means of an impedance architecture.

FIG. 13 shows forces and moments for the knee-jerk tendon reflex.

FIG. 14 shows the degrees of freedom of the knee joint.

FIG. 15 shows a 3D characteristic of the elastic forces in the drawer direction.

FIG. 16 shows a 3D characteristic of the valgus moment.

FIG. 17 shows a characteristic line for the description of joint stiffness.

Figure 1A:
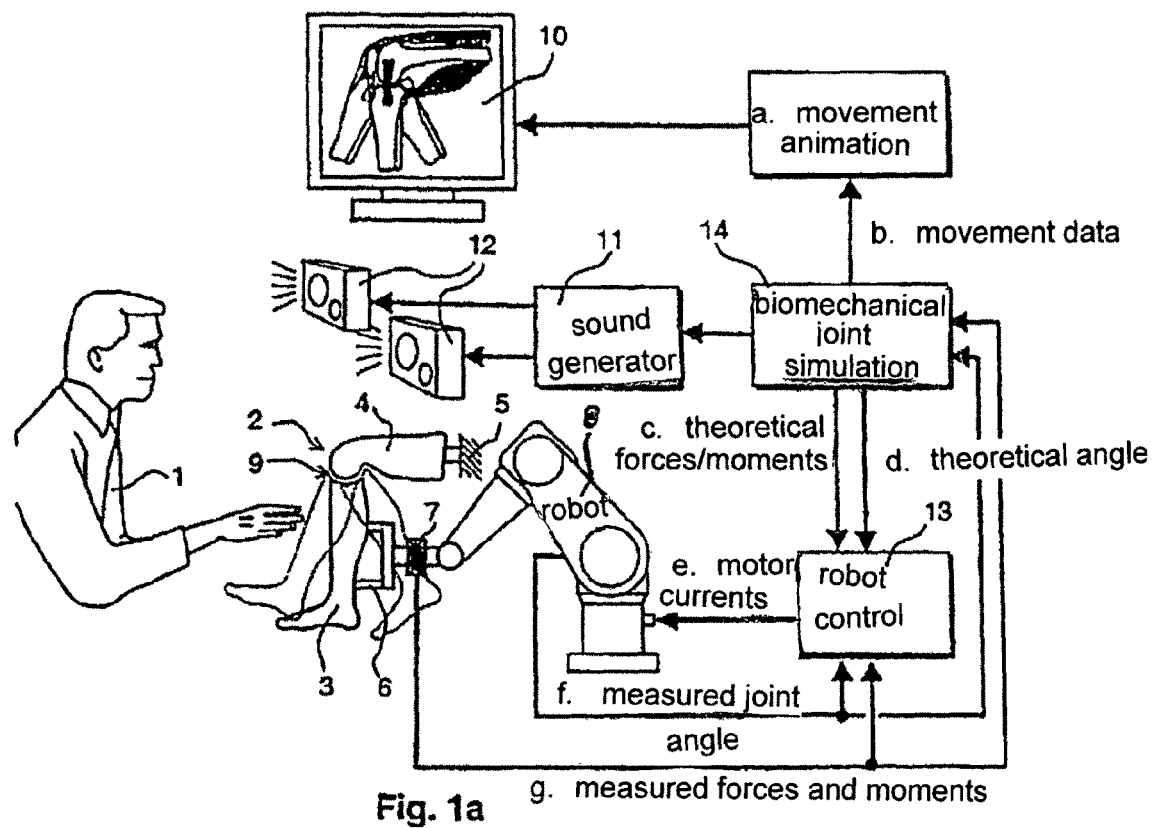
FIG. 1 shows a representation of the principle of the invention in a first embodiment as an interactive knee-joint simulator. An operator 1 conducts tibia movements on an artificial knee joint 2 instead of on a patient.
Figure 1:
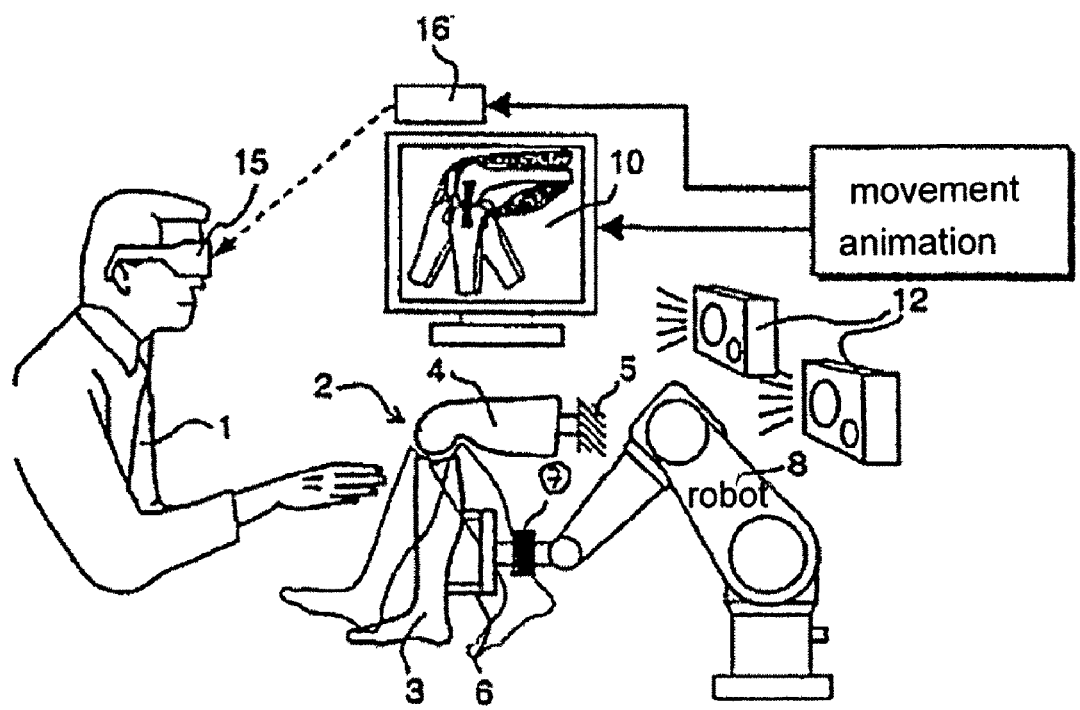
Figure 1:
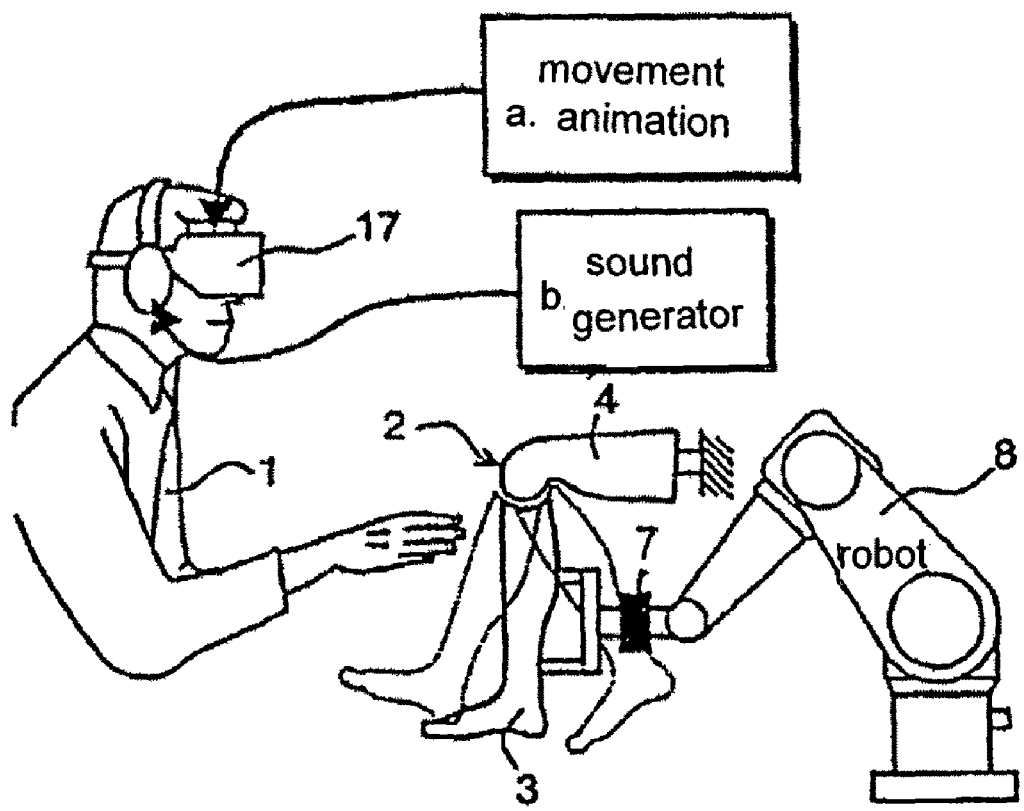
Figure 1:
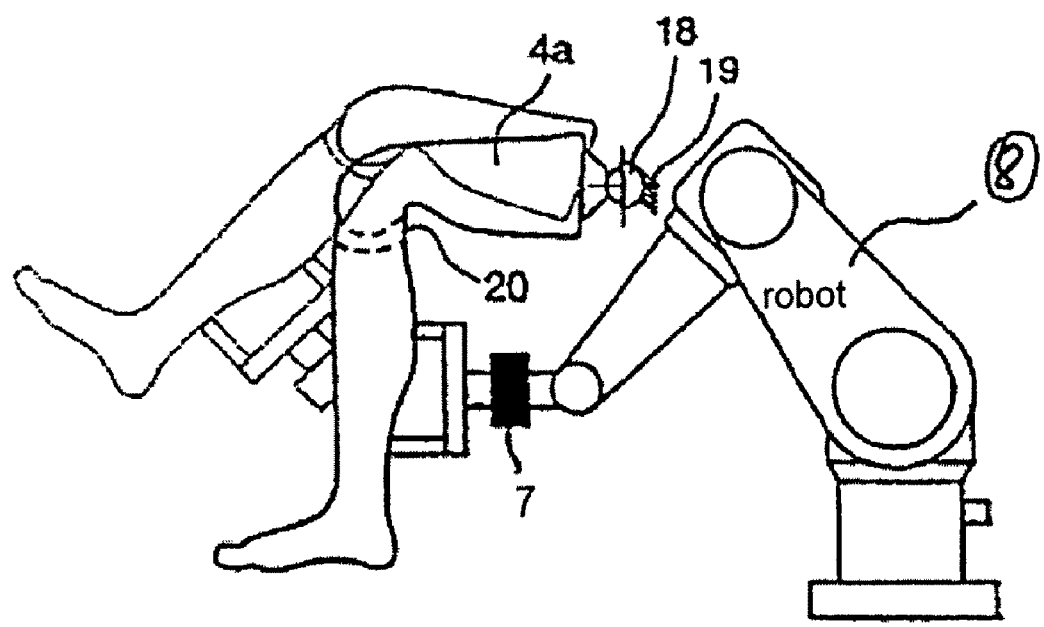
Figure 1:
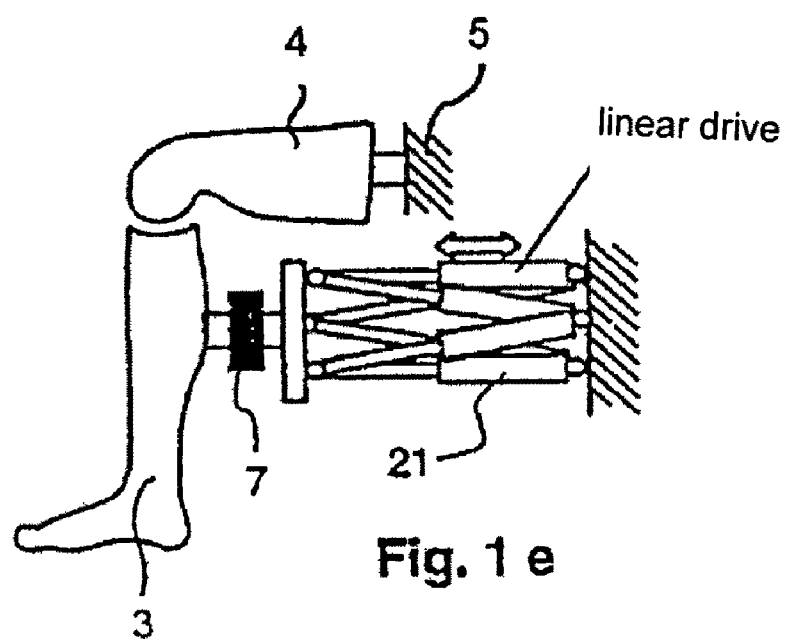
Figure 1:
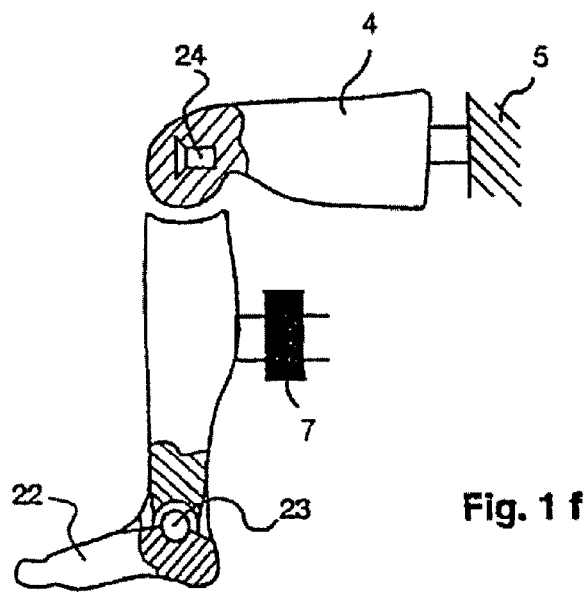
Figure 1:
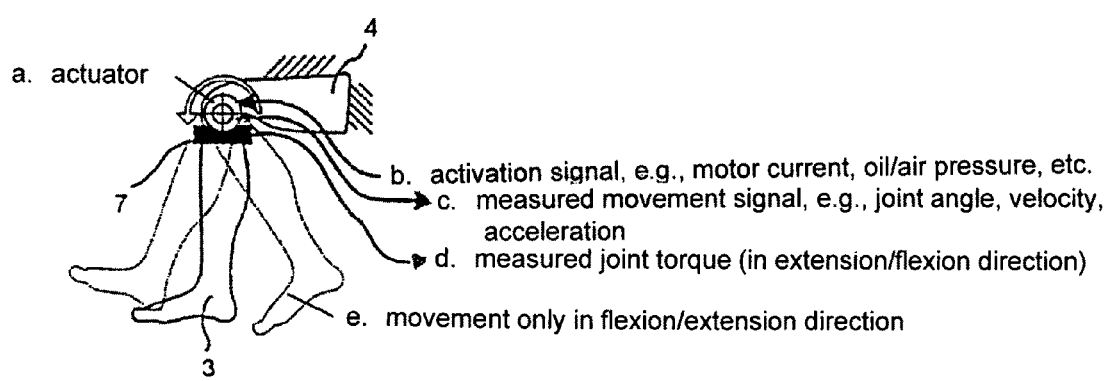
Figure 1:
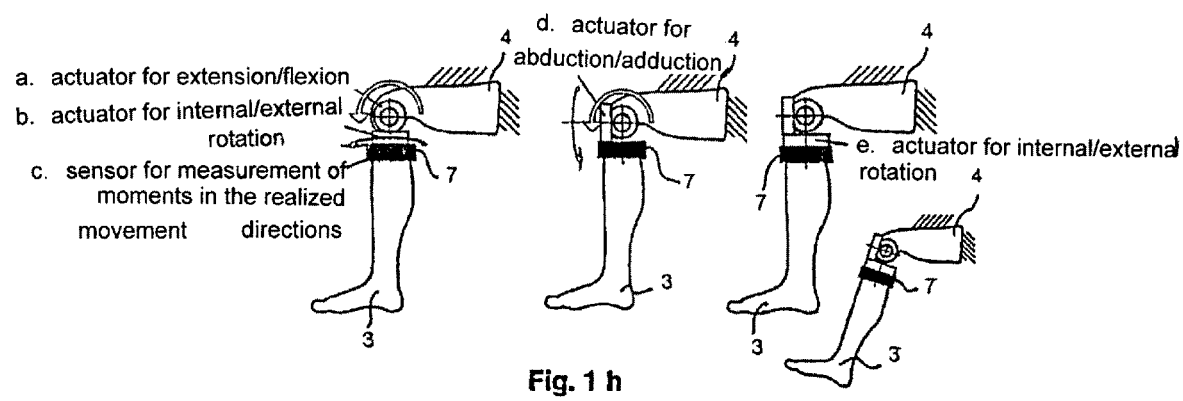
Figure 1:
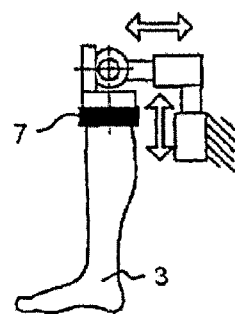
Figure 1:
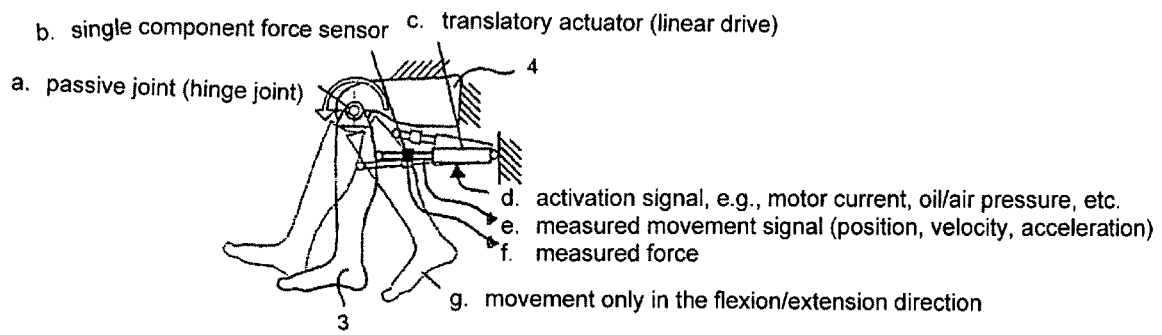
Figure 1:
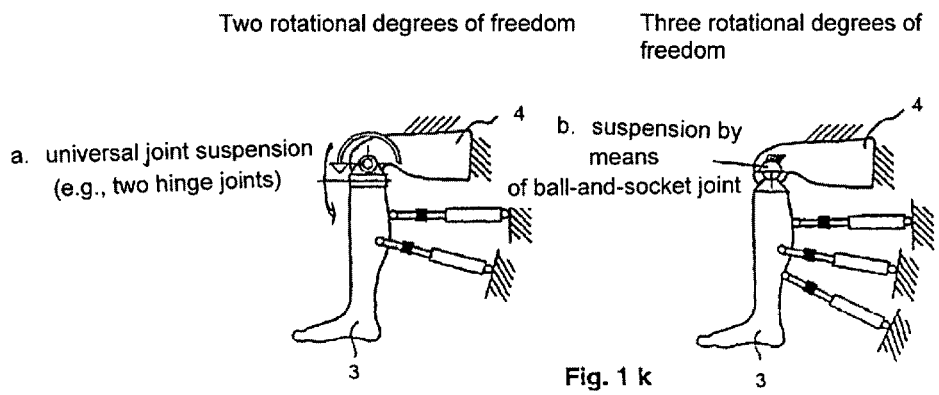
Figure 1:
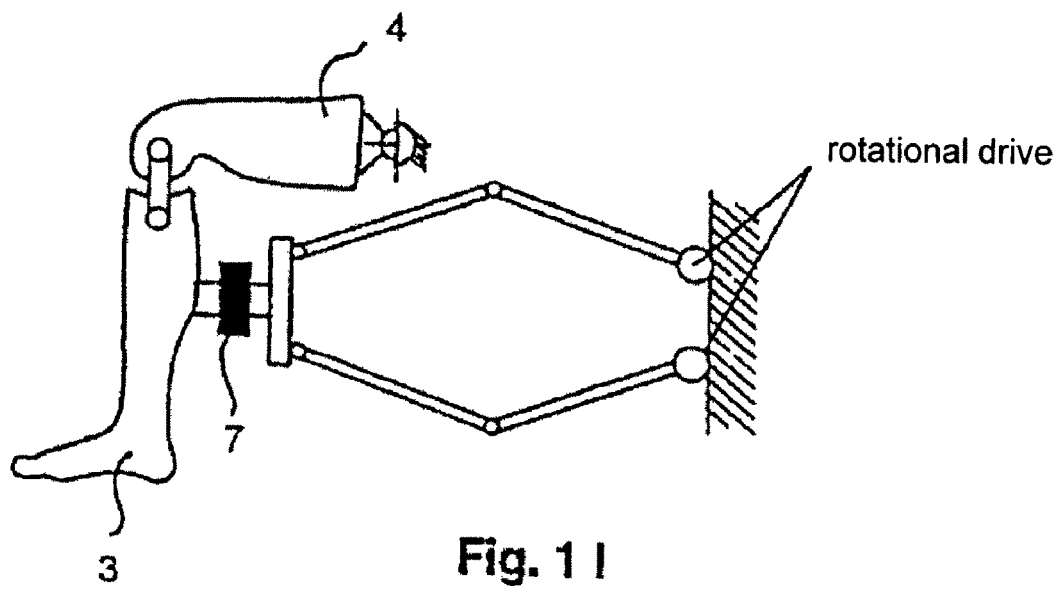
Figure 1:
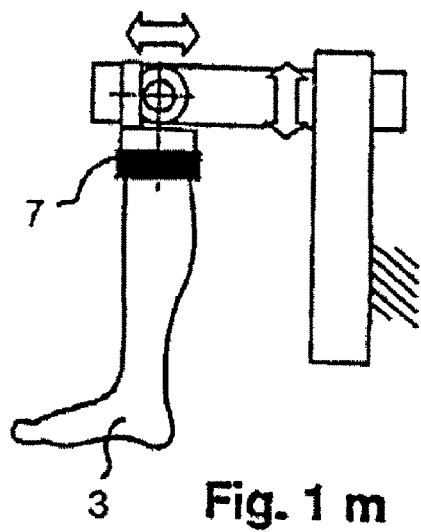

Knee joint 2 is composed of an artificial tibia 3 and an artificial femur 4. Both segments possess a realistic shape and anatomically correct hardness properties and thus permit the palpation of anatomically relevant sites (femur condyles, kneecap, tibia plateau, small head of the fibula, tibial tuberosity, edge of the tibia, ankle, tarsal bones, toes). Femur 4 is mounted on a frame 5. It can be adjusted in its spatial orientation and position, but is fixed in space during movement of the knee joint. The femur is necessary in order to be able to better recognize and evaluate the relative movement between femur and tibia optically and by touch.

Tibia 3 is attached via a joining element 6 and a six-component force-moment sensor 7 to a force actuator mechanism 8 (the robot). In this way, tibia 3 can move in space and can assume any desired position and orientation. The force moment sensor 7 arranged between joining element 6 and robot 8 collects the three-dimensional forces and moments induced by the examining person 1 on tibia 3 and conducts these further to the robotic control and the biomechanical joint simulation (in the computer). The femur and the tibia are contact-free in the joint region at any position of the tibia. A gap 9 resulting therefrom is only approximately 1 mm wide, thus conserving a realistic appearance of the leg.

The force actuator mechanism 8 consist of serial kinematics, i.e., several robotic segments are serially joined together via actively driven axes of rotation. The direction of the axes of rotation is selected such that the end effector of the robot and the components rigidly arranged thereon: sensor, joining element and tibia, can be moved in six degrees of freedom (three positions and three orientations). The joint angles of robot 8 are detected via joint angle sensors and passed on to the robotic control and biomechanical joint simulation. The six degrees of freedom of the robotic end effector and thus of the tibia are determined therein from the joint angle data.

The movements and deformations of anatomical components are determined in a movement animation calculation from the movement data of the tibia processed in the biomechanical joint model and visualized on a monitor 10 (graphic display)

Further, commands are introduced into a sound generator 11 from the biomechanical joint calculations. The latter sees to it that sound programs dependent on the situation are reproduced by a pair of stereo speakers 12 (acoustic display).

The interaction between operator and tibia plus force actuator mechanism consists of the fact that the operator (equivalent to the master) contacts the tibia and exercises a force on it in a desired direction. The tibia (which represents the slave together with the force actuator mechanism) reacts thereto by moving according to natural, passive properties.

This can be accomplished in principle according to two methods:

The first method (admittance control) consists of the fact that the forces and moments that occur when tibia 3 is touched are detected by the force-moment sensor 7 and are transferred to the biomechanical joint simulation. There, the resulting movement of the tibia 3 is calculated and passed on to a robotic control 13 as a theoretical value. The robotic control 13 compares the calculated theoretical movement with the measured robotic movement and introduces motor currents into robot 8 in such a way that the errors in position and velocity between the measured and calculated movements are minimal.

In the second method (impedance control), the change in position and orientation induced by the action of forces and moments is detected and is transferred to a biomechanical joint simulation 14, which calculates the corresponding forces and moments on that basis and reproduces them as theoretical values at the robotic control 13. The robotic control 13 compares the calculated theoretical forces and moments with the actually occurring ones and moves the robot 8 so that the errors in force and moment that occur are minimal. One can alternate between the two types of control (admittance and impedance control) or a combined strategy can be applied.

The biomechanical joint simulation 14 includes a computer model of a human knee joint, which presents the passive joint forces and moments occurring in the joint as a function of the tibia movement (spatial positions/orientations and their derivatives, i.e., velocities and accelerations) relative to the femur. In this way, either the resulting movement of the tibia can be calculated from the measured forces and moments (admittance control) or the responsible knee forces and moments can be calculated from the measured tibia movement (impedance control).

Due to the control of the mechanical force actuator mechanism, the operator has the impression that he/she has caused the movement. The artificial tibia feels like it is connected to the femur by real, joint-spanning anatomical structures (ligaments, tendons, etc.), although the two segments 3, 4 are not connected with one another. By appropriate selection of parameters in the biomechanical joint simulation 14, not only physiological (healthy) but also pathological (diseased) joint conditions can be represented and communicated.

The movements and deformations of anatomical components, such as, e.g., bone, cartilage, ligaments, menisci, joint capsules, muscles, tendons, skin, are determined in a movement animation calculation from the movement data of the tibia 3 which are processed in the biomechanical joint model 14. All components and their movements are visualized on a monitor 10. Pathologies are taken into consideration by graphically animating the lesioned or modified structures and their atypical movement behavior.

From the biomechanical joint calculations, after exceeding pregiven threshold values, commands are conducted to the sound generator. This generator then calls up different prestored sound programs that are dependent on the simulated patient type as well as on the pathology, movement and load situation and transmits these as audio output signals to a pair of stereo speakers 12. In this way, joint noises can be reproduced, and sounds, which are articulated by the simulated patient, e.g., such as a pain reaction in case of movement of a wounded joint, can be generated.

FIG. 1*b* shows a modified graphic display, in which a three-dimensional image impression can be generated by the operator by means of the monitor with the use of shutter glasses 15. For this purpose, the monitor alternately generates an image for the right and left eyes. The shutter glasses 15 synchronize with monitor 10 alternately the light transmission of the left and right lens of the glasses. Since the image sequence is so rapid that the human brain can no longer process each image individually, there results a three-dimensional image impression. The synchrony between monitor image and shutter glasses is controlled by a transmitting unit 16, which is set up in the vicinity of the shutter glasses. It transmits pulses to the shutter glasses, which thereupon shut the left or right lens glass with negligible delay. Monitor image and transmitting unit are controlled at the same time by the computer (movement animation), so that a synchrony is always assured between monitor image and shutter glasses.

FIG. 1*c* shows a modified graphic and acoustic display, in which a stereo data helmet (head-mounted display, HMD) is used. A realistic three-dimensional image impression is obtained due to the projection of two separate images to the two eyes. The acoustics are communicated to the operator via a stereo headset.

FIG. 1*d* shows a representation of the principle of the haptic display of the interactive knee joint, in which the artificial femur 4*a* is passively moved during the joint movement. The femur 4*a* is attached to a stationary frame 19 via a ball-and-socket joint 18 at the proximal end (region of the hip joint). The distal end of the artificial femur (region of the knee joint) is connected with the tibia 3 by an elastic artificial skin 20, whereby the femur 4*a* passively moves with the tibia 3. Therefore, if femur 4*a* is not passively moved together with the tibia in the case of an axial rotation (internal/external rotation) of the tibia 3, it is necessary to configure the rotational degree of freedom of ball-and-socket joint 18 in the hip region, so that it can be arrested around the longitudinal axis.

In the selection of the joining material, care must be taken that the suspension of the femur is made as statically stable as possible, i.e., the femur should neither be displaceable, since if it were, it would rotate away upon contact or under the influence of gravity, nor should it be able to be pre-stressed, since this [leads] to distortions in the system, including the accompanying falsifications (e.g., erroneous force and moment measured values).

FIG. 1*e* shows the representation of the principle of a haptic display, consisting of a force actuator mechanism with a parallel kinematic mechanism 21 (hexapod robot, Stewart platform). This is characterized in that it is constructed from six linear drives. By length changes in the six drives, any desired anatomically meaningful three-dimensional position and orientation of the end effector can be established. A six-component force-moment sensor, which passes on its measured signals to the robotic control and biomechanical joint simulation, is installed at the end effector. The artificial tibia with which the operator interacts, is installed on the sensor via a joining element.

FIG. 1*f* shows the representation of the principle for leg segments with an integrated actuator mechanism. The tibia hereby consists of two segments, foot 22 and shank, which are articulated with one another and are actively driven with a motor. A motorized joint 23 is sheathed with plastic, so that the artificial tibia is shaped with the foot in anatomically correct form and can be moved. The foot joint is moved by means of a simple control.

Further, a speaker 24 is integrated at the distal end of the femur in the region of the knee joint. The anatomically correct form and hardness of the femur are maintained. The joint noises occurring during movement are emitted via this speaker, whereby a realistic localization of the noise is made possible for the operator.

FIG. 1*g* to FIG. 1*m* show additional constructive details of a knee-joint simulator. The different embodiments are shown in clear representations so that a repetition in the description need not be included for the person skilled in the art.

Figure 2:
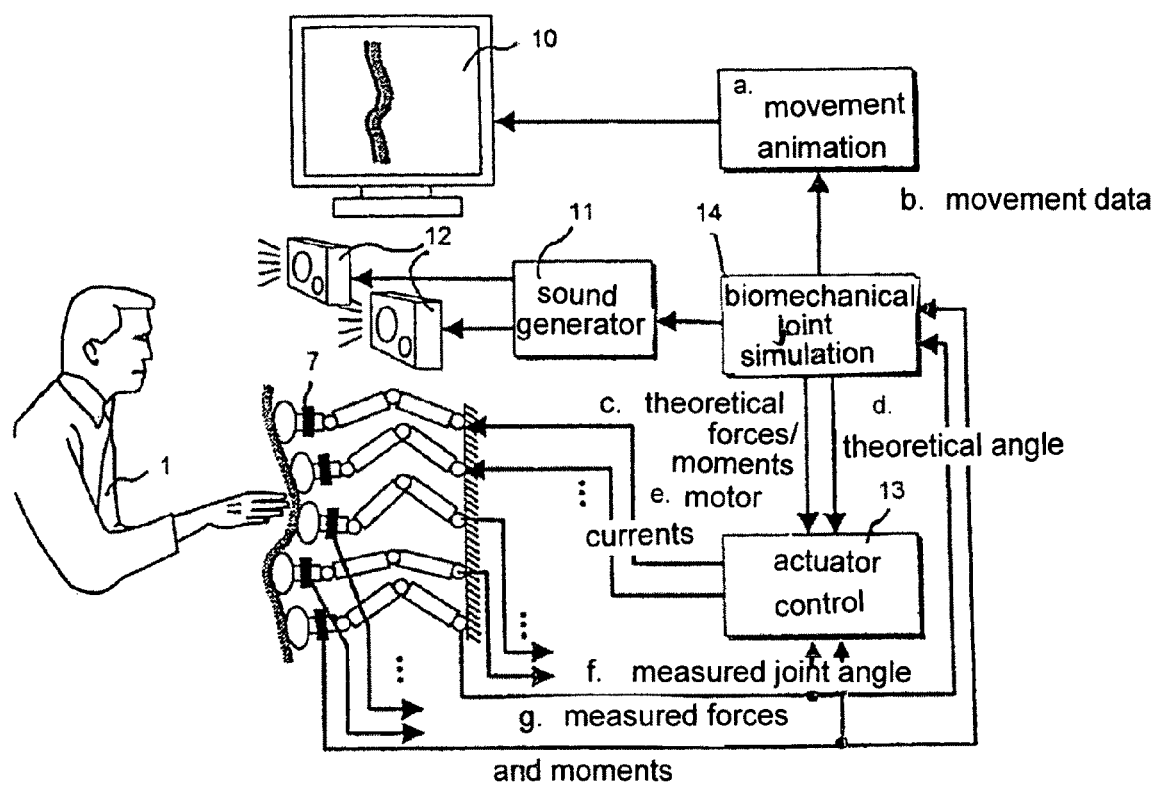
FIG. 2 shows an embodiment of a vertebral column simulator.

FIG. 2 shows a vertebral column joint simulator, which corresponds in structure and function basically to the joint simulator from FIG. 1*a*. Several sensor-actuator components are connected to one another via an elastic membrane. The ellipse-shaped end effectors represent the individual vertebral bodies of the virtual patent. The skin is simulated by the elastic membrane. This provides for covering the gaps between the vertebral bodies and the artificial skin surface feels smooth. The interaction between the vertebral bodies is simulated by the actuators, sensors and control strategies. That is, if the physician exercises a force on a vertebra and moves it, then force and movement are detected and further processed, so that the adjacent vertebra appears to move passively with it.

The following embodiments serve for the complete disclosure of the technical teaching according to the invention. For this purpose, regulation and control theory is also treated extensively and this explains in detail how the person skilled in the art must proceed in order to be able to construct a joint simulator for a specific joint. The knee-joint simulator serves as the basis for the explanations.

In the configuring of artificial leg segments in order to obtain anatomically correct dimensions and hardness properties, a bone model was sheathed with several layers of plastic of different hardness (FIG. 3). After enveloping with layers of foam, the leg skeleton makes possible a realistic palpation of prominent bone sites, such as, e.g., the small head of the fibula or of the malleolus. Body sites, which have only a slight thickness between the bone and the skin surface, such as e.g., the shin, the patella or the ankle, are modeled by gluing on thin plastic layers (24 mm thick, Shore hardness of A18 to A25). At sites where muscle parts are found, multiple layers of harder polyethylene foam layers (10 to 20 mm thickness, Shore hardness of A20 to A40) are glued on and finished by grinding down, so that the anatomically correct forms of the muscle contours are outlined. Then a soft polyurethane is provided as an overcoat, so that an approximately 1 to 3 cm thick, very palpable surface layer arises. Then a spray-finished PUR plastic is applied onto the entire leg as an elastic skin coating.

Operating Modes:

The different operating modes will be described below in order to disclose the multiple application possibilities of the invention.

1. Interactive Operating Mode

In the interactive operating mode, the operator moves the robot, which thus interacts with the operator. For this purpose, the operator contacts the tibia and attempts to move it in the desired direction. The forces, moments and movements that arise are measured and further processed by means of a model-based control, so that the tibia moves in the desired direction according to its biomechanical properties.

2. Active Operating Mode

In the active operating mode, the robot moves according to a rigidly preset trajectory. The operator is thus guided by the robot and confidently makes specific joint tests with the optimal movement course. The forces introduced by the operator can be measured, displayed and evaluated simultaneously. Since the robot is functioning here as a teacher, this type of operation is also called teaching mode. The trajectories of the joint tests can be taken from the literature or determined by contact-free methods of measuring movement.

3. Static Operating Mode

For specific applications, the knee simulator can also be operated in a simple static mode, which is performed entirely without robot movements. In this way, forces and moments, which the operator exercises on the tibia when conducting any desired actions, are recorded. Such actions can include, for example, palpations, artificial surgical or arthroscopic interventions, function tests with a resting leg or taps onto the tibia to trigger the knee-jerk or Achilles tendon reflexes. Based on the measured force and moment curves, relevant knowledge can be obtained for the learning process of the operator. The curves can be compared on-line or offline with the recordings of other operators or of the teacher. On the other hand, if specific limiting values are exceeded, the force and moment signals can be utilized also for the triggering of specific events. The triggering of such events can then be made in active or interactive mode. This functional principle is explained in detail below on the example of the knee-jerk tendon reflex.

Graphics:

Internal anatomical components, such as bones, tendons, ligaments and meniscus are visualized on a monitor. Optionally the monitor can be operated in stereo mode together with shutter glasses. The movement animation is produced synchronously with the movements of the haptic display, i.e., the phantom knee of the joint simulator. In this way, it is possible for the operator to study the anatomical and biomechanical relationships inside the body of a healthy or lesioned knee joint even during movement. The visualization is based on segmented and 3D-reconstructed CT and MRT images. This gives the anatomical components a very realistic appearance.

In the graphic rendering, movement-synchronous changes in position of the bones and cartilage, changes in the course of the ligaments and the capsule, as well as deformations of muscles, tendons, and the meniscus are taken into consideration. A visualization of such movement processes is possible due to so-called "cinematic CT and MRT images". This involves a cinematographic technique, which does not permit interactive operation in more than one degree of freedom and thus is unsuitable for application in the VR [visual reality] field (Dupuy et al. 1997; Witonski and Goraj 1999). A model-based animation represents an alternative. Here, all components are modeled in their relevant geometric and viscoelastic properties and their mechanical interplay. For a realistic simulation, however, front-end calculations and complex multi-unit contact models are required, which greatly increase the expenditure for simulation technology.

Therefore, a combined method is appropriate, in which image data as well as anatomical model considerations are used. This approach consists of interpolating and extrapolating geometric data, which have been reconstructed from numerous discrete joint angle positions, in such a way that any arbitrary position of the knee angle can be represented in any important degree of freedom; see also FIG. 4. The interpolation and extrapolation can be produced, supported by the model, by taking into consideration, for example, the volume retention of the muscles as well as the length constancy of the ligaments. Since this is possible with relatively small calculation expense, smooth movements that can be performed in real time can be obtained in any desired movement direction.

Acoustics:

The noises that arise during the knee movement are reproduced with the acoustic display. These can be both passive frictional or snapping noises, which are generated by the contacting joint faces, as well as the utterances of pain of the patient, such as, e.g., a groaning or a brief shriek.

Different joint noises were taken from several subjects by the inventors. Acoustic expressions, which can theoretically occur as a consequence of induced pain, were artificially acquired and likewise recorded. All noises were classified and assembled in an acoustic database.

For the presentation of noises, models must be found, which combine the type of noise with the type of lesion that causes it and the knee dynamics conducted; see also the diagram of FIG. 5. After discussions with physicians, these relationships were described first qualitatively with the help of linguistic variables. Quantitative relationships were derived from the linguistic data with the method of fuzzy logic. The fuzzy models were tested on the basis of two selected examples and are explained below.

In the first example, a relationship was plotted between the extent of the lesion in the case of an internal ligament lesion, impressed valgus/varus moment and the resulting pain intensities. FIG. 6 shows the family of curves of the fuzzy system, in which the "pain" output (z-axis) is illustrated as a function of the valgus/varus moment and intensity of the the ligament lesion. In the second example, meniscus lesions were considered. Here, the evoked pain was modeled as a function of the lesion intensity and localization of the meniscus lesion as well as the flexion angle and the impressed valgus moment.

Technical Specifications for the Knee Simulator

The technical specifications to be fulfilled by the knee simulator are aligned to the clinical function tests to be conducted and the dynamic properties occurring as a result.

Clinical Function Tests for the Knee Joint

In this section, an overview of the different groups and subgroups of the clinical function tests for the knee joint is presented; see also Table 1.

Different tests are used for the examination of joint stability and mobility in the three rotational degrees of freedom. Tests can be subdivided into flexion/extension tests, internal/external rotation tests and varus/valgus tests. These tests are used primarily in the diagnosis of lesions of the capsule-ligament apparatus.

In the drawer test, movements are conducted in the translatory degrees of freedom. Here, the tibia is moved in anterior and posterior direction or in lateral and medial direction opposite the femur.

In the pivot-shift test, movements are conducted in several degrees of freedom and forces are introduced simultaneously from different directions.

Another group includes the rotation tests or recurvatum tests, in which the mechanical equilibrium of all rotational degrees of freedom is determined.

The knee-jerk tendon reflex test serves for determining motor and sensory disturbances.

The above-described tests are selected in order to improve understanding of the embodiments given below.

In all, 86 tests were determined, wherein, however in order to conduct a knee examination, not all tests must be mastered, since many tests differ only slightly in their movement program and the lesions that can be recognized in this way. For illustration, the universal applicability of the knee simulator according to the invention is presented in Table 1.

TABLE 1

Overview of existing and representable knee function tests

| | | Function tests | | |
|---|---|---|---|---|
| No. | Group | Subgroup | Number of tests found | Tests that can be represented with knee simulator |
| 1 | General examination | Inspection | — | N |
| | | Palpation | — | N |
| 2 | Tests in rotational direction | Extension/flexion | 4 | A + B (4) |
| | | Internal/external rotation | 3 | A + B (3) |
| | | Varus/valgus | 4 | B(4) |
| 3 | Drawer tests | Front drawer | 6 | A(6) |
| | | Back drawer | 7 | A(7) |
| | | Lateral drawer | 4 | A(4) |
| 4 | Lachman tests | — | 7 | A(7) |
| 5 | Pivot-shift tests | Anterior direction | 13 | B(13) |
| | | Posterior direction | 3 | B(3) |
| 6 | Rotation tests | — | 3 | B(3) |
| 7 | Meniscus tests | — | 23 | A + B (4), B(12), A(1), N(6) |
| 8 | Resistance tests | — | 7 | A + B (7), Model expansions |
| 9 | Reflex tests | — | 2 | A + B (2) |

N: Not possible or only possible with limitations
A: Only possible with arrested femur (see FIG. 4.37)
B: Only possible with passively moved femur (see FIG. 4.37)
A + B: Possible ib any configuration
Values in parentheses indicate the number of tests that can be set up each time.

N: Not possible or only possible with limitations
A: Only possible with arrested femur (see FIG. 4.37)
B: Only possible with passively moved femur (see FIG. 4.37)
A+B: Possible in any configuration
Values in parentheses indicate the number of tests that can be set up each time.

Function Tests that can be Represented with the Knee Simulator

The general objective is to simulate as many function tests as possible. The basic limitations in the simulation of tests with the knee joint simulator result from the limited number of active degrees of freedom of the robot. Whereas the robot used possesses only six active degrees of freedom, the movement of a leg, consisting of the three segments: femur, tibia and foot can be theoretically described with 18 degrees of freedom. This number can be reduced if specific degrees of freedom, which have only a small extent of movement or are of lesser importance for representing the knee test, are frozen. Since the movements of the foot are not relevant to the application presented here, and it is also assumed that the hip joint does not conduct translatory movements, the system can be reduced to nine degrees of freedom. Further, the number of degrees of freedom can be reduced by additional limitations of the freedom of movement of the leg. Some of the function tests can be set up with a simplified test configuration, in which movements of the femur are not permitted, and the femur is arrested in a stationary but adjustable manner (see FIG. 7A). In this way, the tibia has six degrees of freedom relative to the femur and both rotational movements of the tibia as well as also translatory drawer movements can be represented. Most of the remaining knee tests can be simulated by loosening the arrest and supporting the femur in joint-like manner at each of its two ends (see FIG. 7B). For this purpose, three of the six degrees of freedom of the knee joint are frozen. Preferably, these are the three translatory degrees of freedom; the leg is then particularly suitable for the representation of macroscopic movement programs.

Instead of reducing the degrees of freedom of the test structure to six or fewer degrees of freedom, the alternative is also offered of introducing additional active degrees of freedom, in order to thus obtain a more realistic representation of a human leg with nine or more degrees of freedom. This could be accomplished, for example, by a second actuator, which is connected to the artificial femur.

In principle, the function tests can be conducted both in the active and in the interactive operating mode. In the interactive mode, however, care must be taken that the forces and moments transmitted from the femur to the tibia are negligibly small or are known and reproducible. Only then can the forces and moments between operator and leg be clearly determined, which must be guaranteed for an unobjectionable control and for representation of the correct biomechanical properties. In the configuration with arrested femur, this is not a problem, since the femur and tibia do not come into contact. In the configuration with movable femur, only small forces and moments occur, which are also known and thus can be compensated.

Dynamic Properties of the Function Tests

Changes in the knee position and knee angle can be estimated accurately by the operator to approximately one millimeter and a few degrees. Finer resolutions are not necessary in the clinical examination of knee lesions, since deviations only of more than 3 mm are viewed as pathological.

The velocities that occur in the examination of the leg vary from one test to another. Rapid movements occur, for example, in the McMurray test, which is conducted for the diagnosis of meniscus lesions. In this test, the knee joint attains velocities of approximately 130°/s.

The magnitudes of the examiner's forces introduced in the tests are very different. High forces occur when the examining physician must hold the entire leg, thus foot, tibia and femur, against the force of gravity for purposes of conducting a test. Typical values for this are 100-150 N. Similarly high forces, but in the horizontal direction, are introduced in the drawer test. The torques occurring in this test, of course, depend on the lever arms considered. The moment acting on the knee joint in a drawer test amounts to approximately 10-15 Nm, if a typical lever arm of 10 cm is assumed.

The high stiffness, which the human knee joint possesses in certain movement directions, must be achieved as much as possible by the robot, so that the flexibility of the robot does not act disruptively on the position and orientation of the end effector.

In addition to the characteristic kinematic and kinetic values which occur in conducting the function tests, the dynamic behavior of the knee joint must also be taken into consideration for designing the actuator. For this reason, the system dynamics of the knee joint were investigated on the basis of the presented biomechanical model. After linearizing at several selected joint angle positions, the characteristic frequencies of specific movement directions were recorded. The characteristic frequencies lie below 1.5 Hz in the flexion/extension and valgus/varus directions. In the anterior/posterior direction, the characteristic frequency assumes a clearly greater value of 11-19 Hz as a consequence of the high stiffness.

TABLE 2

Realizability of the technical specifications

| | Real knee properties | Actuator (Stäubli RX90)* |
|---|---|---|
| Positional accuracy | ≈1 mm | ±002 mm reproducible accuracy |
| Angle accuracy | ≈1° | <0.0028° |
| Velocities | <250°/s with pendulum movement | <286°/s |
| Forces | <150 N | <120 N |
| Moments | <15 Nm | <10 Nm |
| Stiffness | translatory: <200 N/mm rotational: <16 Nm/° | <150 N/mm |
| Dynamic properties | Characteristic frequencies: <19 Hz | Scanning rate: 4 kHz (62.5 Hz)# |
| | Snapping effects: >10 Hz | |
| | Vibration effects: <50 Hz | Mechanical bandwidth: 10–20 Hz |

*The technical data represent the maxima of the weakest joint or for the most unfavorable constellation each time. Consequently, higher values can also be produced frequently.
The low value applies only to the original control.

Dynamic Properties that can be Represented with the Actuator:

The prerequisite for a realistic simulation is that the described dynamic knee properties can also be represented by the actuator. The knee properties thus determine the technical specifications which the actuator must satisfy. The better the actuator corresponds to the specifications, the more realistic are the represented knee properties.

The Stäubli robot RX90 was selected for producing the haptic display. Due to the high positional accuracy and the high attainable velocities of 283°/s (in the slowest joint), the kinematic specifications are well fulfilled. The forces and moments that can be generated by the robot are likewise found in the required value range (see Table 2). The selected JR3 force-moment sensor, with its measurement range of ±200 N in the translatory and ±20 Nm in the rotational degrees of freedom can detect the loads that occur. The robot has a high stiffness. The stiffness behavior of the robot was determined experimentally for the translatory degrees of freedom. The stiffness in the region of the end effector amounts to 150-200 N/mm depending on the direction of excursion and is thus found in the same order of magnitude as the stiffness of the human knee joint.

In formulating the problem of control technology, a scanning frequency is recommended, which amounts to 15-50 times the bandwidth to be represented. Therefore, in this application, a scanning rate of approximately 750-2500 Hz would result. Similarly high values of at least 1 kHz are also recommended in other applications for the scanning of haptic displays. The original control computer of the robot does not fulfill this specification, since it requires relatively long cycle times of 16 ms, which corresponds to a scanning rate of 62.5 Hz The rate is increased to 4 kHz, however, with a newly constructed PC-based control.

Active and Interactive Mode: Control Strategies

Control of Haptic Display

Basically all problems of power control of mechanical actuators are applicable also to the knee joint simulator (haptic display) (Colgate and Hogan 1989; Eppinger and Seering 1987; Townsend and Salisbury 1989), whereby in the case of the present invention, additionally, the human interacting with the actuator (robot) is included in the control circuit. This represents a particular challenge in control technology, since the mechanical properties can vary greatly and the behavior of the operator is generally not predictable. The person skilled in the art can obtain additional suggestions in this regard from the publications of Kazerooni and Her 1994; Brown and Colgate 1997; Clover 1999; Hannaford and Adams 1999; Carignan and Cleary 2000 have investigated the methods for control and stabilization of such human-machine interactions.

The function of a mechanical system can be represented by the relationship between force f(t) and movement x(t). This is defined as mechanical impedance Z, if the movement acts as an impressed magnitude. For example, if a body possesses a high mechanical impedance, then this means that a large force must be introduced in order to move the body against its elastic, damping and/or passive resistance. The inverse relationship with force as the input quantity is designated admittance Y:

$$f(t)=Z(x(t)), x(t)=Y(f(t))$$

The representation of a haptic interaction can result via an admittance or impedance architecture. FIGS. 8 and 9 show in network presentation how in this case the admittance $Y_v$ or impedance $Z_v$ to be virtually represented is related to operator B via the haptic display H, represented as a two-port network. In the case of admittance architecture, the corresponding movement $x_v$ is determined from a measured force $(f_v=f_B)$ given in advance by the operator by means of a virtual admittance $Y_v$ (FIG. 8). The task of the haptic display is to illustrate this movement $x_v$ as exactly as possible for the operator. The operator reacts to the impressed movement $x_B$ with a suitable force response $f_B$ via the impedance $Z_B$ of the interacting body part (e.g., his/her hand or arm).

The relationships in the case of the impedance architecture are correspondingly reversed (FIG. 9). As a consequence of the input and output behavior of the haptic display, it follows from the above-given explanation that the haptic display is controlled by position in the case of admittance architecture, and is controlled by force in the case of impedance architecture.

The objective of the haptic display is to impart to the operator the same force and movement impressions as they will be experienced for the admittance or impedance to be represented. In the ideal case (tranparency), the following will be valid accordingly:

$$x_B=x_v, f_B=f_v$$

However, since each haptic display possesses its own dynamics based on its mass and friction, finally it must be attempted to achieve transparency also under non-ideal boundary conditions by a corresponding underlying control of force and position in the haptic display. It is a complicating factor that all three components, i.e., the virtual admittance or impedance to be represented, the haptic display and the operator generally have nonlinear properties.

Both control architectures presume that the virtually presented admittance or impedance can be explicitly described. An admittance control then proves favorable when large impedances $Z_v$ or mechanical forced conditions (e.g., a virtual wall, i.e., $Z_v \to \infty$ or $Y_v=0$) will be relayed. In this case, the dynamics of the measured force signal will be greatly reduced by the low-pass property of the admittance to be represented, so that the underlying orbital control only needs to follow small positional changes. Sensor noise (force sensor) consequently only very slightly affects the orbital control. Vice versa, the impedance control is particularly suitable for the presentation of small impedances $Z_v$ and is thus predestined for conducting free movements ($Z_v=0$).

With these embodiments, it is communicated to the person skilled in the art that the mechanical bandwidth of a haptic display depends not only on the properties of the technical components used, such as power of the drive or weight of the moved structural parts, but is also influenced by the operator impedance. This depends on how and with what body segments the operator is associated with the haptic display, which passive, anthropometric properties the corresponding segments possess and what behavior the operator exercises, i.e., whether the acts "kindly" passive, "aggressively" active or "stubbornly" stiff.

Active Mode (Teaching Mode)

In the active operating mode, the phantom knee of the joint simulator follows a theoretical trajectory, given in advance, which corresponds to the movement program of a typical joint function test. Measured movement data of the knee joint were processed offline and are available as theoretical position curves $q_{k,theor}(t)$ of a classical orbital control, as shown in FIG. 10. The forces exercised when a segment of the leg of the operator contacts the robot are compensated for as disturbance quantities by the orbital controller.

Interactive Mode

In this operating mode, the operator has the possibility of influencing the movements of the robot or giving them in advance. Here, the robot operates as the haptic display whose task is to represent the mechanical properties of the virtual object. The technical control is produced on the basis of two different architectures, admittance or impedance architecture.

The admittance control can be derived from an expansion of the orbital control architecture (FIG. 10). The loads $\tau_B$ acting between operator and robot are detected with a force-moment sensor In a biomechanical knee model, the knee movement resulting from the actual load sitiation $\tau_B$ is then calculated and introduced into the orbital controller as the theoretical movement $q_{K,\,theor}$ (FIG. 11).

The orbital controller finally generates the corresponding actuator moments $\tau_A$, which drive the robot. In order to improve the control behavior, the measured operator forces can be considered as disturbance variable compensation [feedforward] in the orbital control algorithm (FIG. 11, dashed arrow). A library of different parameter sets are available, which make possible a simulation of knee joints with different healthy or pathological properties.

The movement equation is based on the biomechanical model of the knee joint:

$$M(q_K)\ddot{q}_K + \underline{G}(q_K) + \underline{D}(\dot{q}_K) + \underline{E}(q_K) = Q_B$$

The equation describes the knee movement, which results when the operator contacts the tibia, whereby these relationships will be explained in more detail below. For describing the admittance, this movement equation must be solved for the movement value $q_k$. For correct inclusion of the knee model in the controller architecture, the necessary coordinate transformations between Cartesian space, knee system and robot joint space will be conducted. The generalized knee loads $Q_B$ result from a transformation of the operator forces and operator moments $\tau_B$ from Cartesian space into the knee system. The knee coordinates $q_k$ calculated in the movement equation are passed on as $q_{k,theor.}$ to the orbital controller, where they are finally transformed into the robot joint space.

Alternatively, an impedance control can also be used, which is characterized by a force control in contrast to the admittance control which is controlled by position. The principle of the impedance control is to calculate the underlying operator forces and moments $\tau_{B,theor.}$ from the measured movement or angle signals and to introduce a force control algorithm (FIG. 12). The biomechanical movement equation must be transformed accordingly for this purpose. Knee joint velocities and accelerations can be determined by numerical differentiation of the measured angle signals converted to the knee system. If the angle signal is associated with too much noise, then these values can also be obtained by means of gyroscope and accelerometer sensors. The force control algorithm sees to it that the calculated interaction forces between robot and operator are converted with the smallest possible error.

As already presented, an admittance control then proves favorable when large impedances, e.g., in the form of forced mechanical conditions, will be relayed. Conversely, the impedance control is primarily suitable for the representation of small impedances, e.g., in the form of free movements. Since in the simulation of body joint movements, the impedances are never zero, and very high values can in fact be admitted at the edge of the joint angle range, an admittance control is preferred in the application presented here.

The static mode will be described below on the example of the knee-jerk tendon reflex: The knee-jerk tendon reflex will be triggered by tapping the patellar tendon below the kneecap. In this way, the patellar tendon generates a tensile force, which extends the femur muscle and thus evokes an extension of the leg. The extent of movement of the freely suspended tibia is drawn on for the evaluation of neurological functions and depends first of all on the existing pathology and individual stimulus thresholds, and secondly, on the magnitude and site of the tapping force applied, e.g., with a hammer.

A virtual knee-jerk tendon reflex can also be represented with the knee simulator proposed here. For this purpose, an examination is made of whether the contact force measured with the force-moment sensor satisfies the conditions which are necessary for triggering a reflex. Only when these are fulfilled, after maintaining a short latency time of 55 ms, is a brief, typical reflex extension moment of 5 Nm generated, which deflects the tibia from its resting position. Right after this, the tibia executes a Clamped oscillation around its resting position, as long as the operator does not influence the movement by contacting the tibia. A reflex will be triggered in this way, if the amount of the contact force F and its gradient each exceed a minimum value, i.e.:

$$|\underline{F}| > 10 \text{ N} \quad \text{und} \quad \frac{d|\underline{F}|}{dt} > 200 \text{ N/s}.$$

[und = and]

It must also be assured that the contact point lies in the region of the knee tendon. Thus the following relation must be valid for contact angle $\alpha$ and the distance $|B|$ of the contact point from the center of the knee:

$|\alpha| < 20°$ und $0.02 \text{ m} < |B| < 0.05 \text{ m}$

[und=and]

The success of the test can either be graphically illustrated or can be confirmed by a movement of the artificial tibia. For the latter, of course, it must be switched from the static to the active or interactive operating mode.

Assuming that the force is introduced by the reflex hammer free of moment, the exact point of impact is calculated exclusively from the reaction loads recorded by the force-moment sensor. It should be mentioned particularly that no force or pressure sensory mechanism thus need be provided in the region of the impact point in the phantom leg.

FIG. 13 shows that a measured force-moment pair $F_S$ and $M_S$ can be theoretically achieved from different load situations on the leg. The following static equilibrium conditions apply to each situation:

$$F_S = F \text{ and } M_s = M + r \times F$$

with the unknown impressed loads F and M.

The vector r represents the sought site of the introduction of force in the sensor coordinate system with origin S. In case of a tap with a pointed hammer, it can be assumed that the loads are introduced free of moment, i.e., M=0 It then follows that $$\underline{M}_S = \underline{r} \times \underline{F}_S = \begin{pmatrix} r_x \\ r_y \\ r_z \end{pmatrix} \times \begin{pmatrix} f_{Sx} \\ f_{Sy} \\ f_{Sz} \end{pmatrix} = \begin{pmatrix} m_{Sx} \\ m_{Sy} \\ m_{Sz} \end{pmatrix},$$

wherein the components of the vectors and $F_S$ and $M_S$ are known. The equation system follows therefrom:

$$\begin{cases} r_y f_{Sz} - r_z f_{Sy} = m_{Sx} \\ r_z f_{Sx} - r_x f_{Sz} = m_{Sy} \\ r_x f_{Sy} - r_y f_{Sx} = m_{Sz} \end{cases}$$

with the unknowns $r = (r_x, r_y, r_z)^T$. In the experiment to solve for r, it is established that the equation system is underdetermined, since the determinant is always zero:

$$\begin{vmatrix} 0 & f_{Sz} & -f_{Sy} \\ -f_{Sz} & 0 & f_{Sx} \\ f_{Sy} & -f_{Sx} & 0 \end{vmatrix} = 0$$

This means clearly that the site of the introduction of force in space cannot be determined exactly. Instead, only the position of the line of application of the impressed force F can be determined. This lies in the plane E, which is found orthogonal to $M_S$ with $S \in E$ and can be represented as a parameter function in the sensor coordinate system:

$$g_S(\lambda) = r^* + \lambda F = r^* + \lambda F_S$$

wherein r* is any vector between origin S and the line of application, e.g.

$$r^* = \frac{|M_S|}{|F_S|} \frac{F_S \times M_S}{|F_S \times M_S|}.$$

Since the surface of the contacted object (i.e., the tibia) is known, finally the point of introduction of force can be determined from the points of intersection of the line of application with the surface. The impact point of the hammer is that point of intersection at which the force is directed into the body.

In order to implement the knee-jerk tendon reflex in the knee simulator, it is not necessary to analytically determine the contact point coordinates. A simple query of whether the correct place was impacted or not is sufficient. Here, it is examined whether the measured reaction loads lie within a defined, empirically determined range of values, which are representative of a "hit". This simplification is permissible, since it is known from the previous presentations that a clear assignment is possible between reaction load and impact point. As mentioned above, the prerequisites for this are that a moment-free, unidirectional introduction of force occurs and the tibia is penetrated only at one place by a line of application.

Implementation

Orbital Controller

As is common in robotics, the orbital control is produced with the support of a so-called "computed torque" approach. In order to minimize the influence of the undesired dynamic properties of the haptic display, the motor torques necessary for the actual position and movement of the robot are thus linearized by means of an identified, dynamic robot model prepared within the scope of this project. The residual dynamics resulting from the simplifications/inaccuracies of the model as well as perturbations are finally compensated for with a proportional-plus-derivative controller.

The robot model considers joint friction and mass properties. The robot parameters (masses, positions of center of gravity, friction coefficients) were identified by means of frequency response measurements at the individual joints. Although the deviation terms of the mass moments of inertia [angular momentum] as well as the Coriolis effects of the robot were initially disregarded, this simplified version of the model has already supplied a satisfactory control performance.

PC-Based Control

The haptic display was verified by means of the six-axis Stäubli industrial robot RX90. The original control computer of the robot requires relatively long cycle times of more than 16 ms. For a stable operation of the haptic display and a disturbance-free, realistic representation of biomechanical joint properties, high scanning rates in the kHz range under real-time conditions and a high computing power are necessary for implementing the model-based control method. For this reason, a PC-based control was constructed in parallel. The signals of the angle sensor and force/moment sensor as well as the analog signals for the articulation [joint] amplifier can be switched via a reversing switch from the Stäubli computer onto the PC, where signals can be captured or output via corresponding PC interface cards. The above-described control based on articulation moment interfaces can thus be implemented on the PC by configuration of the articulation amplifier on a current control. Due to the essentially higher computing power of the PC, the scanning time can thus be shortened to 250 μs, which leads to substantially better results than with the original architecture. Of advantage in this procedure is the fact that all original components such as the articulation amplifier, the safety electronics for brakes and the emergency stop circuit as well as the power supply remain and, in addition, can be used.

Biomechanical Model of the Knee Joint

Movement Dynamics of the Tibia

The contact forces F impressed by the operator bring about a movement of the contacted object. The movement of the tibia is described by the movement equation, $$M(q_K)\ddot{q}_K + G(q_K) + D(\dot{q}_K) + E(q_K) = Q_B$$

wherein $q_k$ is the vector of the generalized knee coordinates $q_k = (x_{ant}, x_{med}, x_{pmx}, \phi_{flex}, \phi_{val}, \phi_{arot})^T$, which describes the spatial position and orientation of the tibia. Thus, $x_{ant}$, $x_{med}$ and $x_{prox}$ are the translatory displacements in the anterior, medial and proximal directions, and $\phi_{flex}$, $\phi_{val}$, and $\phi_{arot}$ are the rotations in knee flexion, valgus rotation and external rotation (FIG. 14). M is the matrix of inertia of the tibia with the foot. G denotes the gravitational moments that occur. Contributions of Clamping and elastic moments in the knee are described by the two terms D and E. $Q_B$ represents the generalized loads. The influence of active muscle forces is not considered in the movement equation. Since the arrangement considered here involves a simple pendulum, no Coriolis terms occur. The movement equations are solved with an implicit Euler integration method.

The forces F impressed by the operator on the knee joint enter into the movement equation via the term of generalized loads $Q_B = (F_{ant}, F_{med}, F_{prox}, M_{flex}, M_{val}, M_{arot})^T$.

The components of $Q_B$ are determined from the components of the 6-component force sensor.

The mass parameters of the pendulum, which are necessary for the movement equation and consisting of tibia and foot, can be estimated with the regression equations of Zatsiorsky und Seluyanov (1983) as a function of the body size and the body weight of the patient to be simulated. The mass and geometry parameters used in this example are compiled in Table 3:

TABLE 3

Mass and geometry parameters of the tibia (with foot)

| Mass | Principal moments of inertia | | | Distance of the center of gravity from the center of the knee joint |
|---|---|---|---|---|
| m/kg | $J_{flex}$/kgm² | $J_{val}$/kgm² | $J_{arot}$/kgm² | $I_{COG}$/m |
| 4.3 | 0.40 | 0.40 | 0.02 | 0.25 |

The movement of the tibia occurs predominantly in the flexion-extension direction, but the remaining translatory and rotational degrees of freedom must also be taken into consideration for a physiologically correct modeling (FIG. 14). Also, in the case of a wounded knee, the extent of movement can be more clearly pronounced in specific degrees of freedom than occurs in the healthy case. The excursion of the tibia results in all six degrees of freedom due to the force F impressed by the operator.

Viscoelastic Knee Properties

The knee joint is surrounded by ligaments, tendons, capsule tissue and other anatomical structures. These components are expressed by the movement of the tibia in the form of a passive, viscoelastic resistance, which appears with varying intensity in all degrees of freedom. In the movement equation $$M(q_K)\ddot{q}_K + G(q_K) + D(\dot{q}_K) + E(q_K) = Q_B \quad (5)$$

these effects are considered by the elastic, position-dependent term E and the damping, velocity-dependent term D.

According to Markolf et al. (1976), the elastic steady-state characteristic curve can be described for one degree of freedom of movement (e.g., valgus moment as a function of the valgus angle). These are the stiffnesses in the regions on the right, in the middle and on the left of the characteristic curve ($c_r$, $c_m$, or $c_l$) as well as the width of the middle region ($q_m$). The middle region is frequently characterized by a relatively low stiffness or high laxity (elasticity).

Each degree of freedom is considered in isolation and described by a simple M-φ or F-x characteristic curve. Due to the complicated structure of the knee joint, however, there are also dependences on other degrees of freedom. For example, the elastic characteristic curve in the anterior/posterior direction ("drawer direction") possesses a clearly steeper course in the case of the extended knee than in the case of the flexed knee (see Table 4 and FIG. 15).

Markolf et al. (1976) determined the elastic characteristic curves for the degrees of freedom in the anterior/posterior direction, external/internal rotation and valgus/varus rotation derived, which represents the assumed (real) course of the characteristic curve by piecewise polynomial functions:

$$E(q) = \begin{cases} c_l q + \frac{1}{2}(c_l - c_m)q_m & \text{falls } q \leq -\frac{3}{4}q_m & \text{(Bereich I)} \\ c_m q + \frac{16}{27}\frac{c_l - c_m}{q_m^2}q^3 & \text{falls } -\frac{3}{4}q_m < q \leq 0 & \text{(Bereich II)} \\ c_m q + \frac{16}{27}\frac{c_r - c_m}{q_m^2}q^3 & \text{falls } 0 < q \leq \frac{3}{4}q_m & \text{(Bereich III)} \\ c_r q - \frac{1}{2}(c_r - c_m)q_m & \text{falls } q > \frac{3}{4}q_m & \text{(Bereich IV)} \end{cases}$$

[falls=if; Bereich=region]

The variable q thus represents one of the five degrees of freedom $x_{ant}$, $x_{med}$, $x_{prox}$, $\phi_{val}$ or $\phi_{arot}$. Correspondingly, E (q) represents one of the five elastic components:
$F_{out}^E(x_{out})$
$F_{med}^E(x_{med})$, $F_{prox}^E(x_{prox})$, $M_{val}^E(\phi_{val})$ oder $M_{arot}^E(\phi_{arot})$
[oder=or]

This equation can be expanded to the effect that the relevant dependence on the flexion angle of the knee will also be considered. The four characteristic parameters are modeled as nonlinear functions of the knee flexion angle $\phi_{flex}$ for this purpose:

$$c_l = c_l(\phi_{flex}); \; c_m = c_m(\phi_{flex}); \; c_r = c_r(\phi_{flex}); \; q_m = q_m(\phi_{flex})$$

TABLE 5

Parameter functions for considering the influence of knee flexion

| | $q_m$ in ° | $c_m$ in Nm/° | $c_l$ in Nm/° | $c_r$ in Nm/° |
|---|---|---|---|---|
| External/internal rotation | 26.4 − 80/ ($\phi_{flex}$+4.9) | 0.1 + 0.6/ ($\phi_{flex}$+1) | 2.58 (internal) | 2.42 (external) |
| Valgus/varus | 2.94 + 0.0896 $\phi_{flex}$ − 0.0003757 $\phi_{flex}^2$ | 0.7 + 10.3/ ($\phi_{flex}$+1) | 13.3 (varus) | 16.06 − 0.0711 $\phi_{flex}$ + 0.00019 $\phi_{flex}^2$ |
| | $q_m$ in mm | $c_m$ in N/mm | $c_l$ in N/mm | $c_r$ in N/mm |
| Anterior/posterior | 2.0 + 0.259 $\phi_{flex}$ − 0.00688 $\phi_{flex}^2$ + 0.0000456 $\phi_{flex}^3$ | 65 − 1.002 $\phi_{flex}$ + 0.005526 $\phi_{flex}^2$ | 216 − 1.274 $\phi_{flex}$ (posterior) | 112 − 2.279 $\phi_{flex}$ + 0.0292 $\phi_{flex}^2$ (anterior) |
| Medial/(lateral) | 5.0 | 12.0 | 84 + 0.4 $\phi_{flex}$ (lateral) | 140 − 0.7 $\phi_{flex}$ + 0.0025 $\phi_{flex}^2$ |
| proximal/distal | 0 | 0 | 20.0 (distal) | 200.0 (proximal) | on 35 dissected cadaver knees. They conducted the measurements for each degree of freedom for several discrete flexion angles and identified each time a set of four characteristic parameters. Table 4 shows the results of the measurements in the anterior/posterior direction. The increased stiffness values can be recognized for the extended knee.

TABLE 4

Characteristic parameter for describing the elastic characteristic curves in anterior/posterior direction (Markolf et al. 1976)

| Knee flexion angle | $q_m$ in mm | $c_m$ in N/mm | $c_l$ (posterior) in N/mm | $c_r$ (anterior) in N/mm |
|---|---|---|---|---|
| 0° | 2.0 (±0.5) | 65 (±76) | 195 (±220) | 118 (±70) |
| 20° | 4.8 (±2.0) | 9.2 (±6.2) | 224 (±370) | 66 (±25) |
| 45° | 3.9 (±2.5) | 23 (±25) | 148 (±165) | 78 (±40) |
| 90° | 2.9 (±1.7) | 37 (±23) | 99 (±129) | 143 (±157) |

Thus the data in the knee simulator can be used and continuous curves must be plotted from the discrete parameter values. Therefore, a continuously differentiable function was Notes: Flexion angle $\phi_{flex}$ in degrees;

The equations are valid only for $\phi_{flex} > 0$

Table 5 shows the four parameter functions for the five modeled degrees of freedom. The parameter functions for the external/internal rotation, valgus/varus rotation and anterior/posterior drawer were derived based on the measurement results of Markolf et al. (1976). Data of Piziali et al. (1980) were drawn on for the determination of the parameter functions in the medial/lateral direction. In the proximal direction, no experimental data were available from the literature. This course was estimated by a piecewise linear function, which has a clearly greater stiffness in the proximal direction than in the distal direction and is independent of knee flexion angle.

FIGS. 15 and 16 show the results of the modeled elastic characteristic curves in anterior/posterior and valgus/varus directions.

A model of Riener and Edrich (1999) was used for the description of the elastic characteristic curves in the remaining flexion/extension degree of freedom. The passive elastic moment $M^E_{flex}$ is described as an exponential function following the model of other studies (Audu and Davy 1985; Mansour and Audu 1986).

$$M^E_{flex}(\varphi_{flex}) = \exp(1.800 - 0.0352\,\varphi_{flex} - 0.0460\,\varphi_F + 0.0217\,\varphi_H) -$$

$$\exp(-3.971 + 0.0495\,\varphi_{flex} - 0.0004\,\varphi_F - 0.0128\,\varphi_H) +$$

$$\exp(2.220 - 0.150\,\varphi_{flex}) - 4.820$$

Due to the existence of two joint muscles, the stiffness in the knee flexion direction depends on the positions of the neighboring joints. Thus the plantar flexion angle $\phi_F$ and the hip flexion angle $\phi_H$ also appear in the equation. The last exponential term represents the influence of the capsule ligament apparatus of the knee joint and is thus independent of the angle positions $\phi_H$ and $\phi_F$. All angle data are given in degrees. The equation can be correspondingly simplified when in a seated position with constant foot and hip angles.

As a consequence of dissipative effects in the structures surrounding the joint, in addition to the elastic properties, there also occur Clamping, so-called viscous properties. These can be represented for each individual degree of freedom by a simple linear relationship. Experimental data can be determined for the degree of freedom in the extension/flexion direction in the simplest way by passive pendulum drop tests (Riener et al. 1996). The damping coefficient in this direction amounts to $b_{flex} \approx 1.0$ Nms/rad $\approx 0.018$ Nms/° (Riener and Fuhr 1998). No experimental data could by found in the literature for the remaining degrees of freedom. However, since the dissipative effect of the anatomical components can be compared in the other movement directions, this value can be transferred approximately to the other two rotational degrees of freedom. Values are also not available in the translatory directions. They must thus be estimated. The fact that deviations of the Clamping coefficients from the real value are barely noticeable to the operator due to the small extent and velocity of movement in these directions has proven advantageous.

Representation of Joint Lesions

In order to represent joint lesions or disorders, the parameters and parameter functions employed must be adapted to the modified elastic joint properties. This is difficult in many cases, however, since locally modified anatomical structures can act globally in several degrees of freedom. Therefore, the adaptation of the model can be configured, but in a relatively expensive manner. If the modification of individual parameters does not suffice, then entire parameter functions must be replaced.

The model adaptations, however, are clearer and more comprehensive for representing a tear in the anterior cruciate. Such a lesion is primarily expressed by the fact that the stiffness is reduced in the anterior direction (front drawer). In the model, this can be taken into consideration by a down-scaling of the stiffnesses $c_r$ and $c_m$ on the right side and in the middle (anterior direction) and an increase in the region $q_m$ (Markolf et al. 1976). In contrast, the stiffness on the left side remains unmodified, since a torn anterior cruciate essentially does not influence the stability in the posterior direction. The scaling factors, which can be used for adapting the parameter functions of $F^E_{ant}(x_{ant})$ to a torn anterior cruciate, are listed in Table 6. They were derived from experimental data of Markolf et al. (1976).

TABLE 6

Scaling factors for the parameter functions in anterior/posterior direction for the simulation of a torn anterior cruciate.

| $q_m$ (lesioned)/ $q_m$ (normal) | $c_m$ (lesioned)/ $c_m$ (normal) | $c_l$ (lesioned)/ $c_l$ (normal) | $c_r$ (lesioned)/ $c_r$ (normal) |
|---|---|---|---|
| 1.91 | 0.61 | 1.00 (posterior) | 0.43 (anterior) |

Simplified Viscoelastic Knee Model

The biomechanical model approach has already been described in detail. Movement equations, viscoelastic model and the model of the knee-jerk tendon reflex can be fully adopted. For test purposes and for the demonstration of the interactive operating mode, a very simplified biomechanical knee model with six degrees of freedom was developed and integrated into an admittance control architecture. The tibia mass was set at zero, so that inertial and gravitational effects can remain unconsidered (M=0; G=0). The viscous and elastic properties were assumed to be linear and were derived from the knee model already presented. Consequently, the knee joint possesses a low impedance in the flexion direction, and a high impedance in the other degrees of freedom (Table 7). To represent the natural knee tap, with strong extension and flexion, the stiffness in this direction was approximated by a piecewise continuous characteristic curve (FIG. 17).

TABLE 7

Viscoelastic knee joint parameters

| Movement direction translatory | Amount of stiffness | Damping |
|---|---|---|
| anterior-posterior | 100,000 N/m | 200 Ns/m |
| medial-lateral | 60,000 N/m | 200 Ns/m |
| proximal-distal | 100,000 N/m | 200 Ns/m |
| rotational | | |
| flexion-extension | 80/0/23 Nm/rad | 1.0 Nms/rad |
| valgus-varus | 688 Nm/rad | 2.0 Nms/rad |
| internal/external rotation | 143 Nm/rad | 2.0 Nms/rad |

Different knee properties can be simulated, depending on the selection of parameters, with this model approach, and thus a healthy or lesioned joint can be represented. The operator can then conduct various test movements, such as, e.g., a "front drawer test" or a "hyperextension movement" and thus diagnose the simulated lesion.

Summarizing Explanation of the Advantages of the Invention:

The joint simulator with the interactive phantom knee offers to the operator the possibility of interacting with an artificial representation of a human joint. Novel to the approach here is the fact that a realistic simulation of contact impressions is made possible, as they arise in direct palpation and movement of the body parts with the hands and fingers. The knee model used in the interactive mode is characterized by its simple mathematical representation, which is limited to the description of the input-output behavior of the viscoelastic properties.

The theoretical embodiments for the construction of a knee joint simulator enable the person skilled in the art to develop joint simulators for other body segments without the necessity of an inventive step therefor.

The invention claimed is:

1. A programmable joint simulator with force and movement feedback for duplicating modifiable biomechanical properties of human and animal body segments with joints, whereby the joint simulator has the following features:
- a body model, which essentially has the shape and hardness properties of the body segment to be simulated,
- controllable drive elements, which are coupled mechanically with the body model, in such a way that movements of the body model, which correspond to real biomechanical joint movements of the body segment to be simulated, can be effected by controlling the drive elements,
- a sensor arrangement for detecting forces and movements, which are introduced by an examining person with his/her hands, and without a tool, on the body model, whereby the sensors of sensor arrangement are arranged in the kinematic chain between the body model and the drive elements and/or on the drive elements themselves and
- a programmable control device having a computer for controlling the drive elements in response to the manually introduced forces and movements of the examining person to provide haptic movement feedback of the body model to the examining person, whereby the control device is configured such that the measured signals processed by the sensor arrangement are introduced into the computer, in which a simulation program is stored, which, in cooperation with the control device, generates reaction forces and movements, in response to the examining person acting on the body model, that are used to cause the body model to move by means of the drive elements when external force is applied, in such a way that the biomechanical joint properties of the natural body segment, including bones, muscles, ligaments, tendons, cartilage, skin, menisci and joint capsules, are simulated and are sensed by the examining person as a biomechanical property of the respective natural body segment, wherein the representation of a haptic interaction is based on an admittance control architecture or an impedance control architecture.

2. The joint simulator according to claim 1, further characterized in that an optical display device, which is connected to the control device by signal technology, is provided, which shows the examining person a visual representation of a respective natural body segment during the activity on the body model.

3. The joint simulator according to claim 2, further characterized in that the optic display device displays suggestions and additional information.

4. The joint simulator according to one of the preceding claims, further characterized in that an acoustic generator connected by signal technology to the control device is provided for the generation of typical noises, which can occur during the examination of the respective natural body segment.

5. The joint simulator according to claim 4, further characterized in that the acoustic generators are integrated into body model.

* * * * *